United States Patent
Mine

(10) Patent No.: US 11,487,409 B2
(45) Date of Patent: Nov. 1, 2022

(54) APPEARANCE CONFIGURATION OF INFORMATION PROCESSING TERMINAL

(71) Applicant: Sony Corporation, Tokyo (JP)

(72) Inventor: Hiroki Mine, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/259,193

(22) PCT Filed: Jul. 18, 2018

(86) PCT No.: PCT/JP2018/026928
§ 371 (c)(1),
(2) Date: Jan. 11, 2021

(87) PCT Pub. No.: WO2020/016966
PCT Pub. Date: Jan. 23, 2020

(65) Prior Publication Data
US 2021/0271359 A1    Sep. 2, 2021

(51) Int. Cl.
*G06F 3/0484*   (2022.01)
*G06F 9/451*    (2018.01)
*H04M 1/72427*  (2021.01)
*G06F 3/04817*  (2022.01)
*G06F 3/0488*   (2022.01)
(Continued)

(52) U.S. Cl.
CPC .......... *G06F 3/0484* (2013.01); *G06F 3/0488* (2013.01); *G06F 3/04817* (2013.01); *G06F 9/451* (2018.02); *H04M 1/72427* (2021.01); *G10L 15/22* (2013.01); *H04N 5/232* (2013.01)

(58) Field of Classification Search
CPC .... G06F 3/0484; G06F 9/451; G06F 3/04817; G06F 3/0488; H04M 1/72427; G10L 15/22; H04N 5/232

USPC ........................................................ 715/716
See application file for complete search history.

(56) References Cited

U.S. PATENT DOCUMENTS

| | | |
|---|---|---|
| 2009/0164923 A1 | 6/2009 | Ovi |
| 2009/0284463 A1 | 11/2009 | Morimoto et al. |
| 2010/0269040 A1 | 10/2010 | Lee |
| | (Continued) | |

FOREIGN PATENT DOCUMENTS

| | | |
|---|---|---|
| EP | 3324278 A1 | 5/2018 |
| JP | 6-28145 A | 2/1994 |
| | (Continued) | |

OTHER PUBLICATIONS

International Search Report and Written Opinion dated Oct. 9, 2018, received for PCT Application PCT/JP2018/026928, Filed on Jul. 18, 2018, 10 pages including English Translation.

*Primary Examiner* — William D Titcomb
(74) *Attorney, Agent, or Firm* — Xsensus LLP

(57) ABSTRACT

[Problem] To propose an application corresponding to a situation of each user and improve user convenience in starting use of the application.
[Solution] Provided is an information processing apparatus including: a display control unit configured to display, on a display screen, execution information related to execution of at least one application specified on the basis of a predetermined determination result; and a processing control unit configured to execute first processing in a case where the at least one application is specified, and execute second processing on the basis of a response of a user to the displayed execution information.

18 Claims, 17 Drawing Sheets

(51) Int. Cl.
*G10L 15/22* (2006.01)
*H04N 5/232* (2006.01)

(56) References Cited

U.S. PATENT DOCUMENTS

| | | |
|---|---|---|
| 2011/0047461 A1 | 2/2011 | Bargmann |
| 2012/0185803 A1 | 7/2012 | Wang et al. |
| 2012/0233571 A1* | 9/2012 | Wever ............... H04M 1/72427 715/835 |
| 2013/0249843 A1 | 9/2013 | Yano |
| 2013/0285951 A1 | 10/2013 | Jeon |
| 2014/0059494 A1 | 2/2014 | Lee |
| 2014/0258926 A1 | 9/2014 | Min |
| 2015/0135145 A1 | 5/2015 | Kamide et al. |
| 2015/0153946 A1* | 6/2015 | Kim ...................... G06F 3/0416 345/173 |
| 2015/0293664 A1 | 10/2015 | Burchell |
| 2015/0341693 A1 | 11/2015 | Ishizuka |
| 2016/0078465 A1* | 3/2016 | Chai .................. H04N 21/4784 705/14.27 |
| 2016/0092071 A1 | 3/2016 | Lawson |
| 2016/0132132 A1 | 5/2016 | Li |
| 2016/0246488 A1 | 8/2016 | Sassouni |
| 2017/0094162 A1* | 3/2017 | Brauer .................... G06F 3/165 |
| 2017/0160881 A1* | 6/2017 | Kanemoto ............. G06N 7/005 |
| 2017/0195734 A1* | 7/2017 | Park .................. H04N 21/42224 |
| 2017/0195736 A1* | 7/2017 | Chai ................... H04N 21/4821 |
| 2018/0314552 A1* | 11/2018 | Kim ........................ G06F 3/167 |
| 2019/0042066 A1* | 2/2019 | Kim ...................... G06F 1/1649 |

FOREIGN PATENT DOCUMENTS

| | | |
|---|---|---|
| JP | 2008-262251 A | 10/2008 |
| JP | 2009-278294 A | 11/2009 |
| JP | 2012-150804 A | 8/2012 |
| JP | 2013200828 A | 10/2013 |
| JP | 2013-246727 A | 12/2013 |
| JP | 2015-22319 A | 2/2015 |
| JP | 2015-220698 A | 12/2015 |
| KR | 20110021043 A | 3/2011 |
| WO | 2013/187137 A1 | 12/2013 |

\* cited by examiner

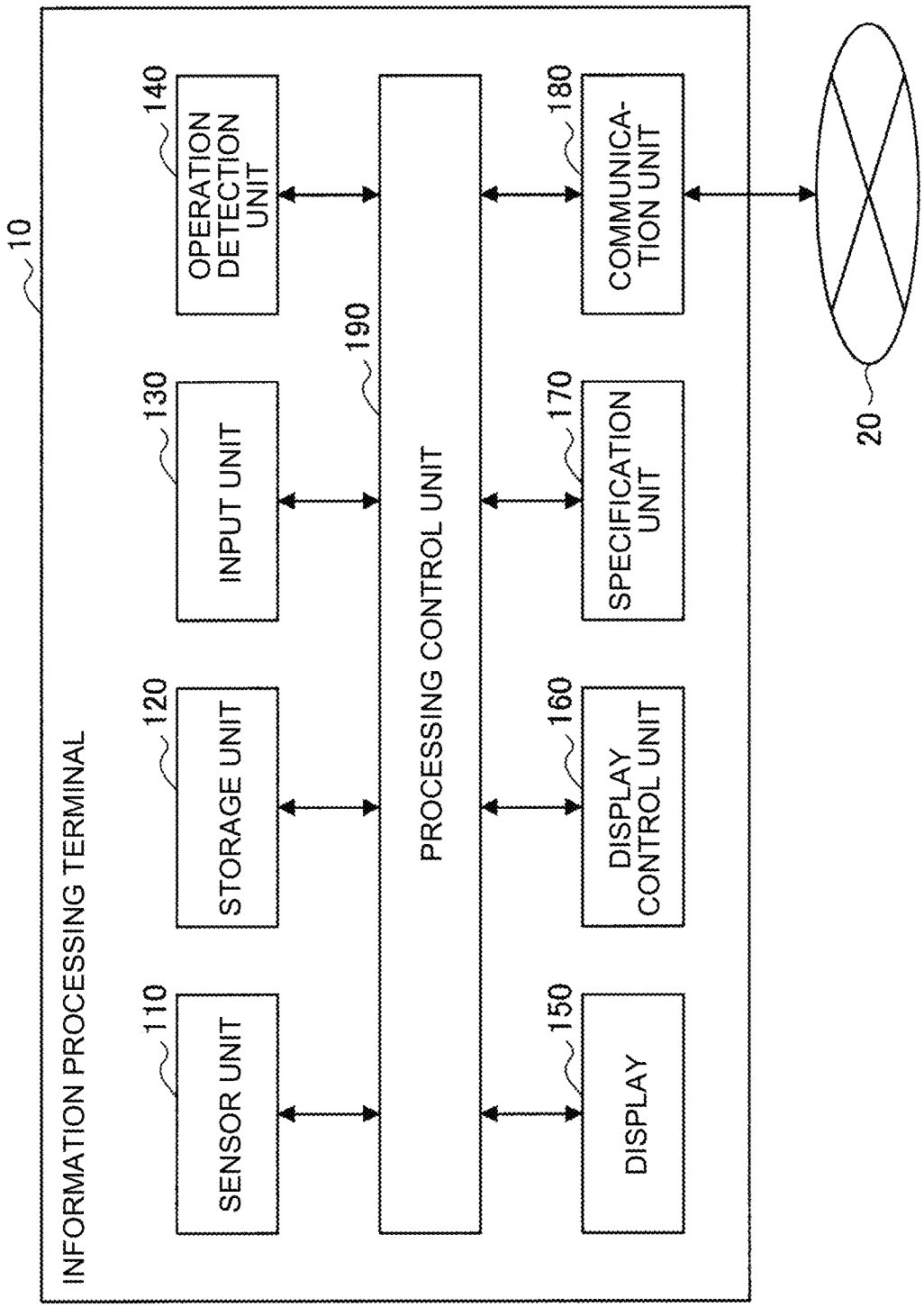

FIG.4
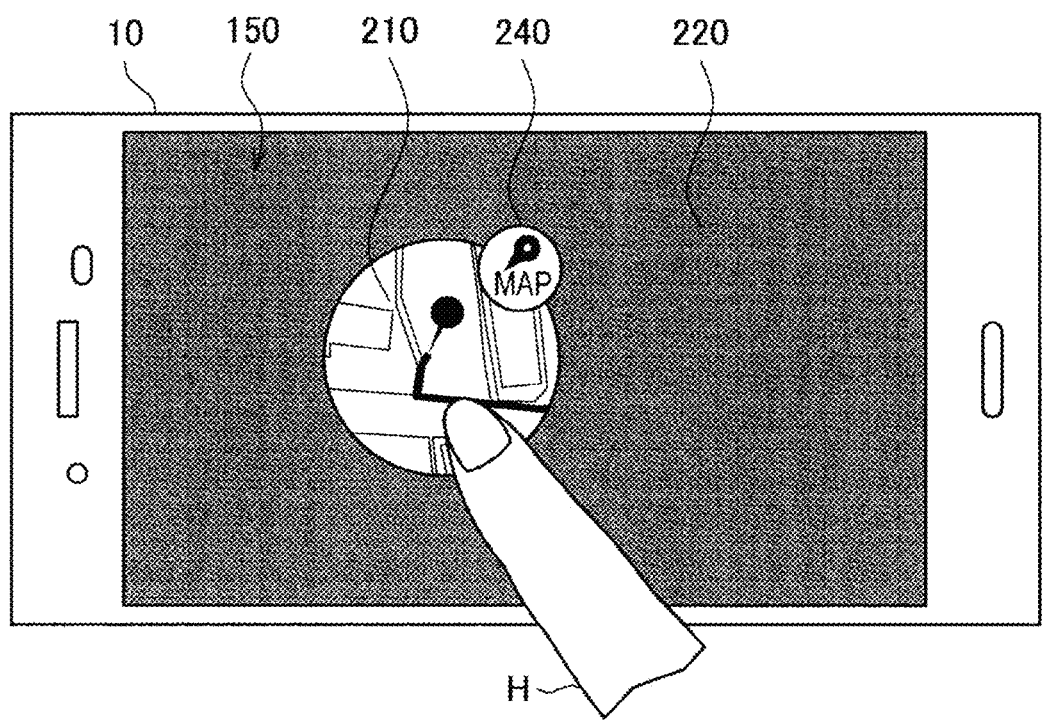
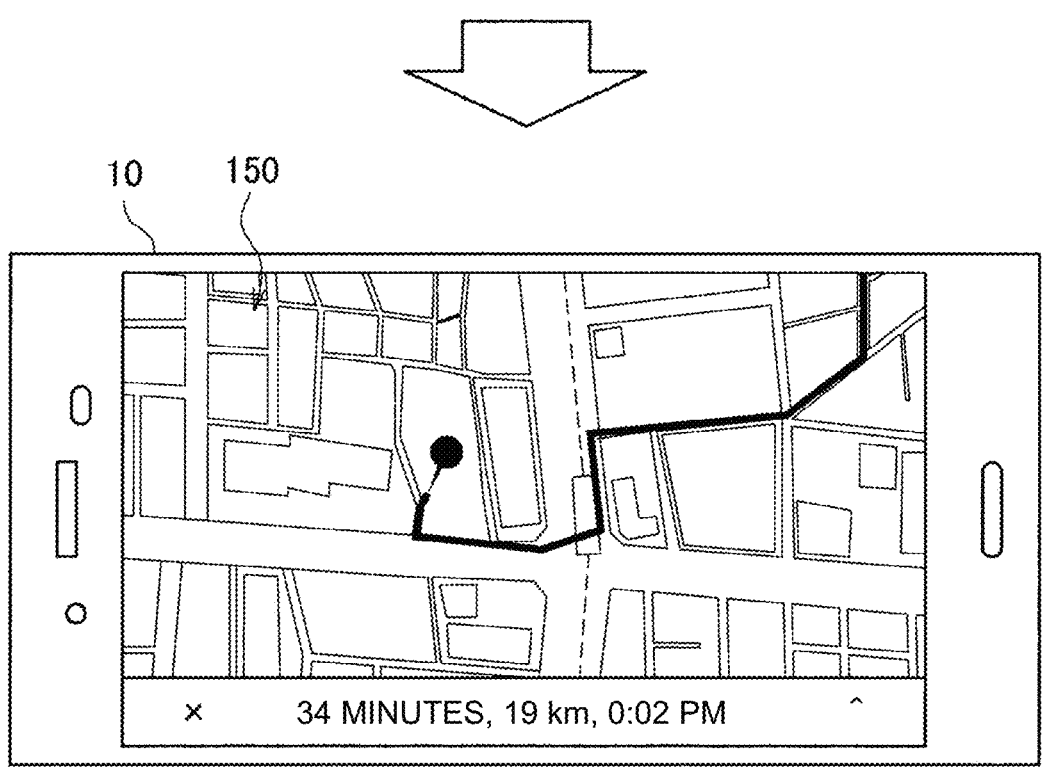

FIG.5
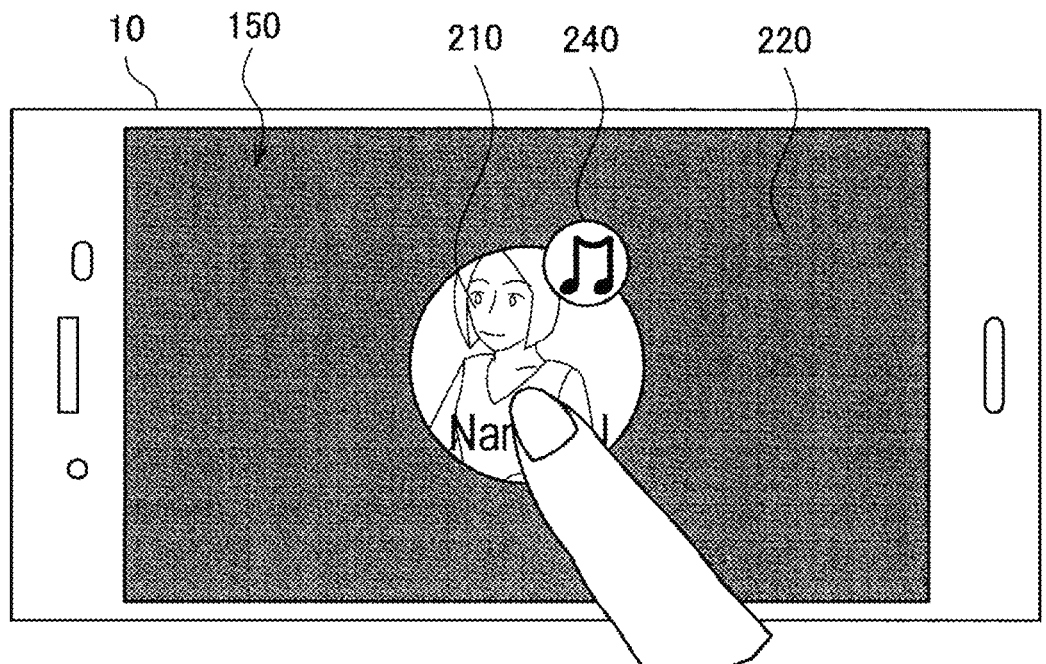
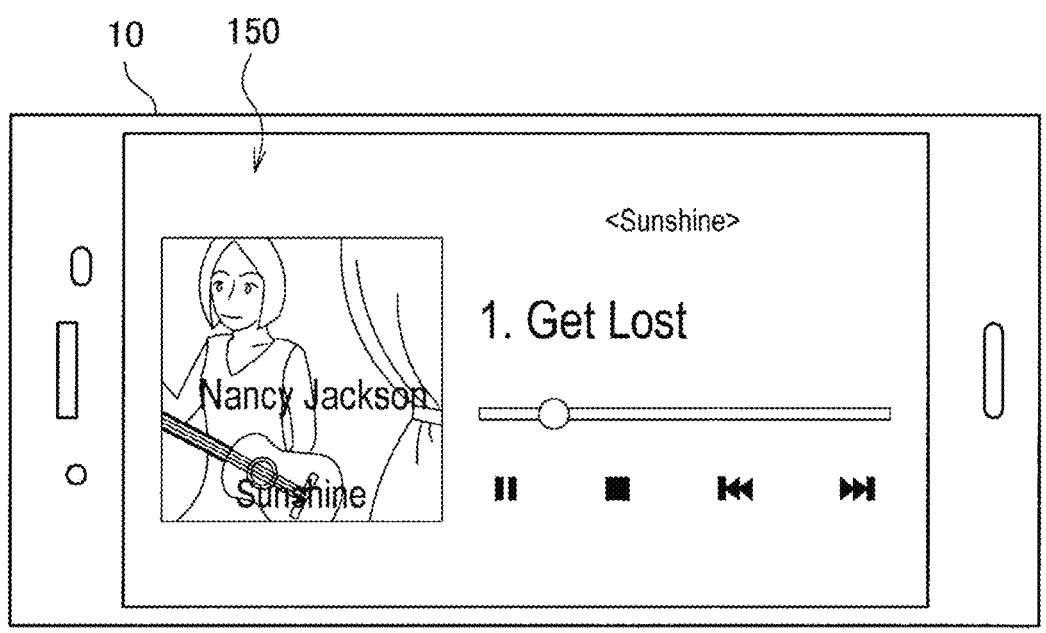

FIG.6
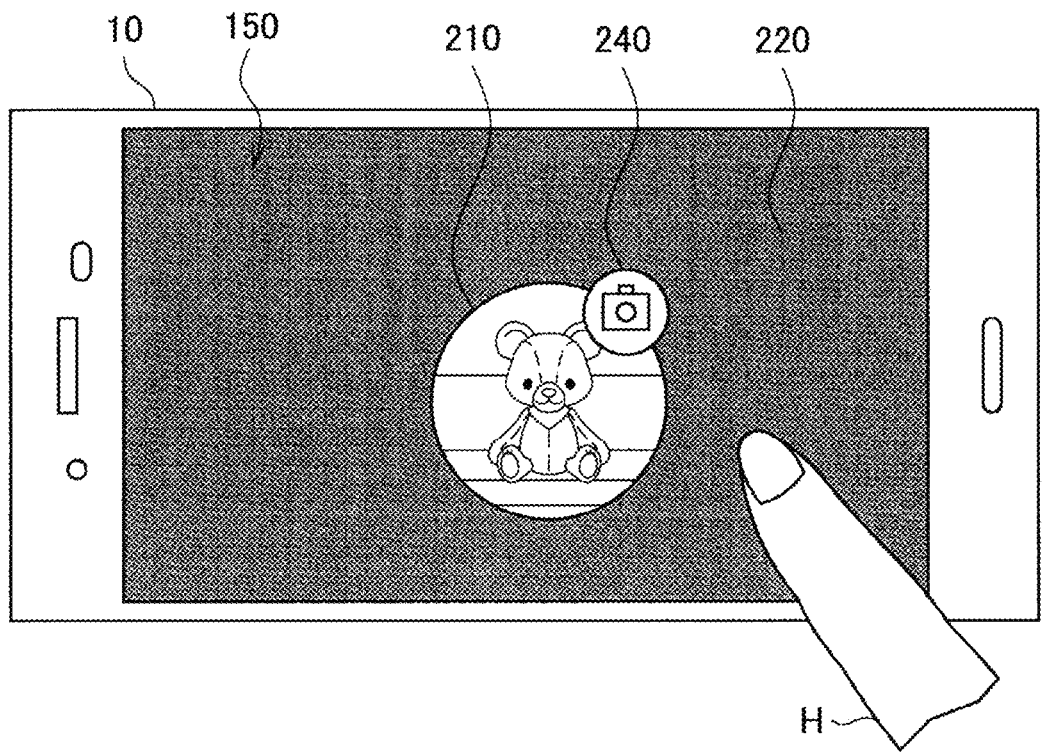
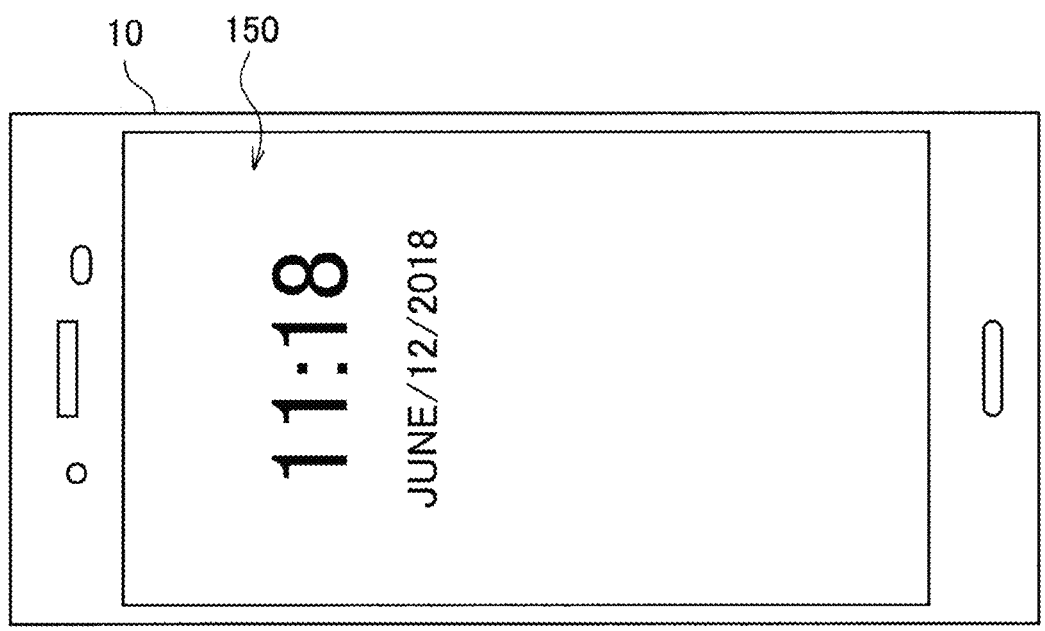

FIG.7
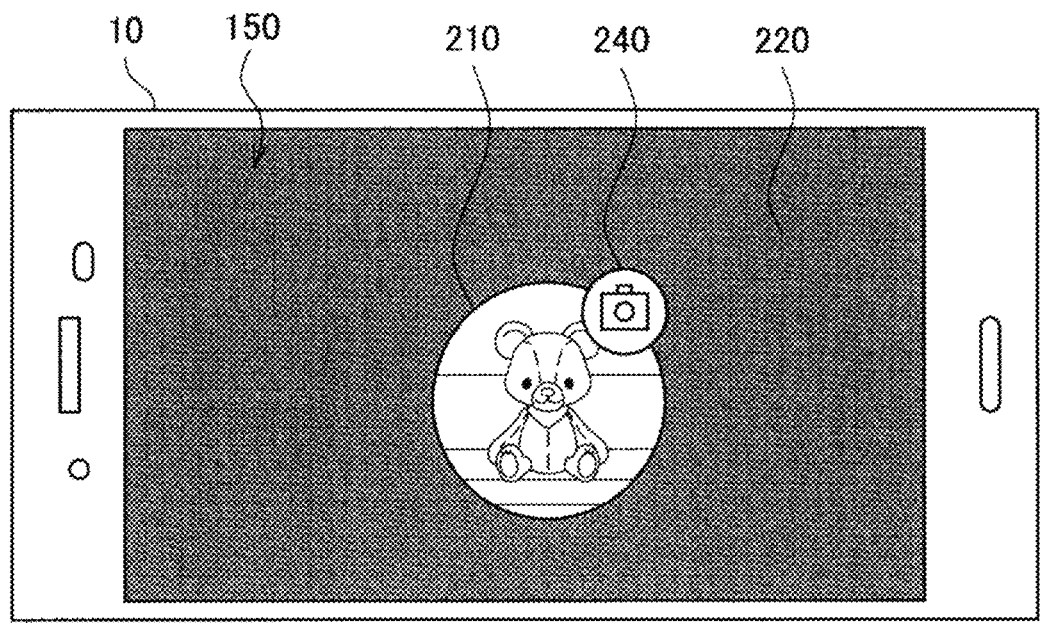
⟨5 SECONDS LATER⟩
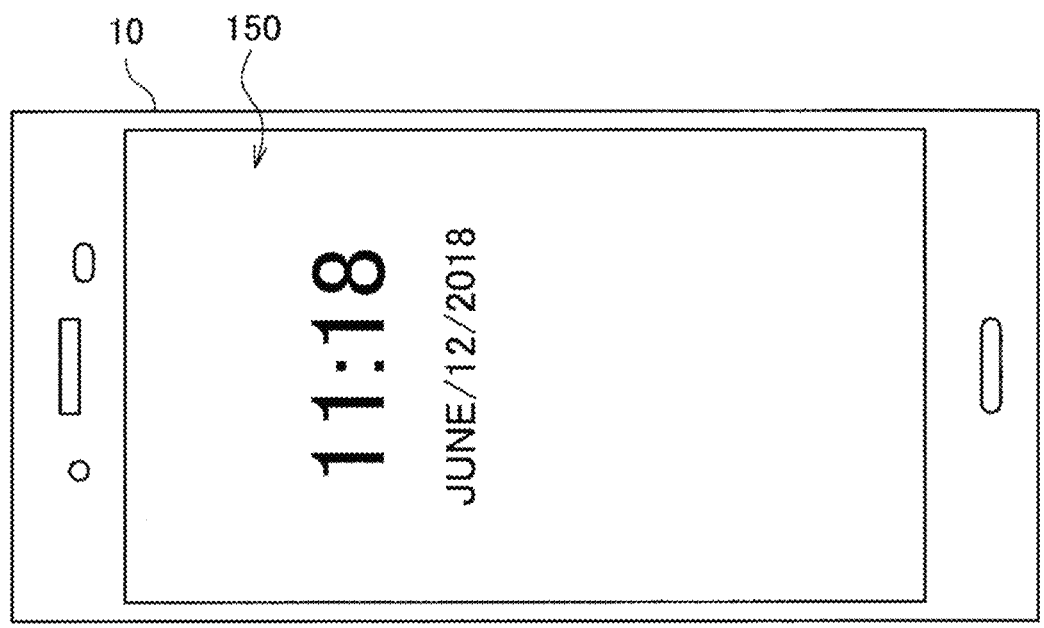

FIG.8
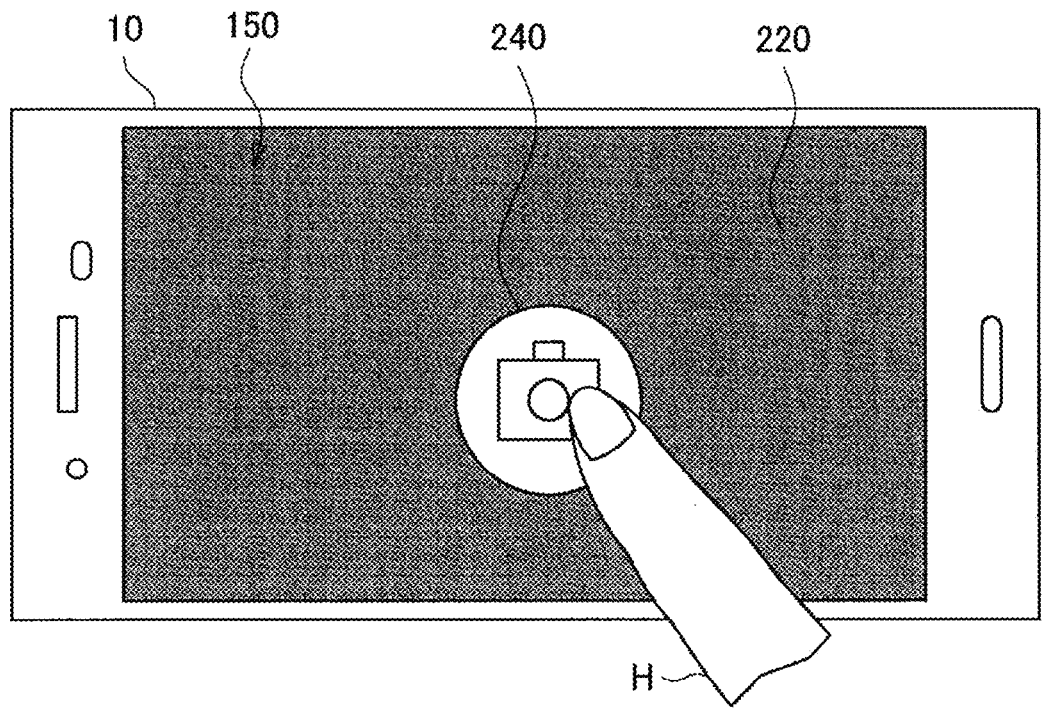
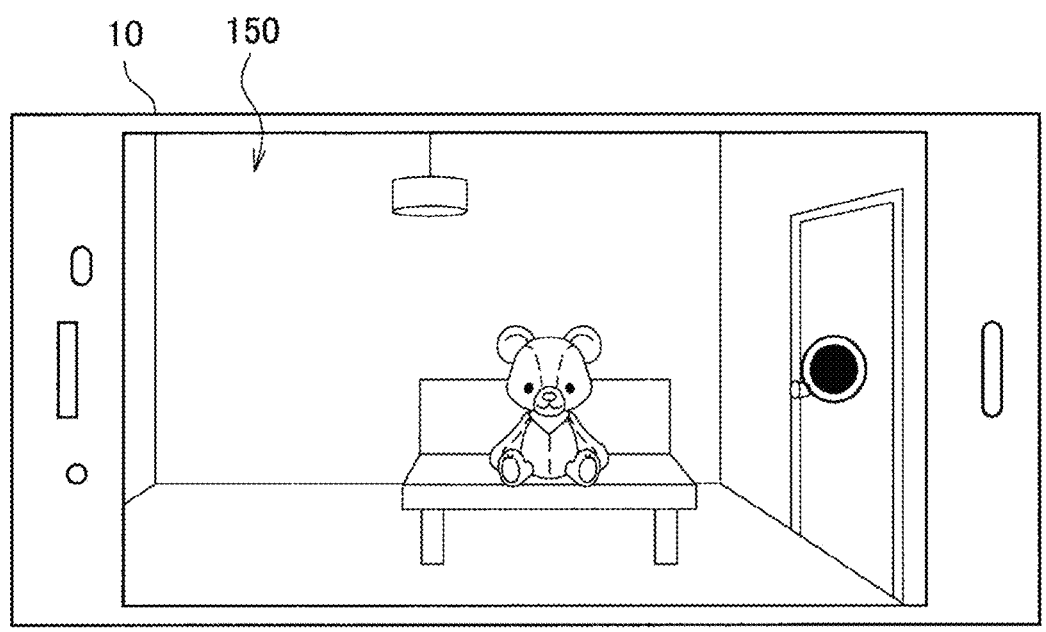

FIG.15
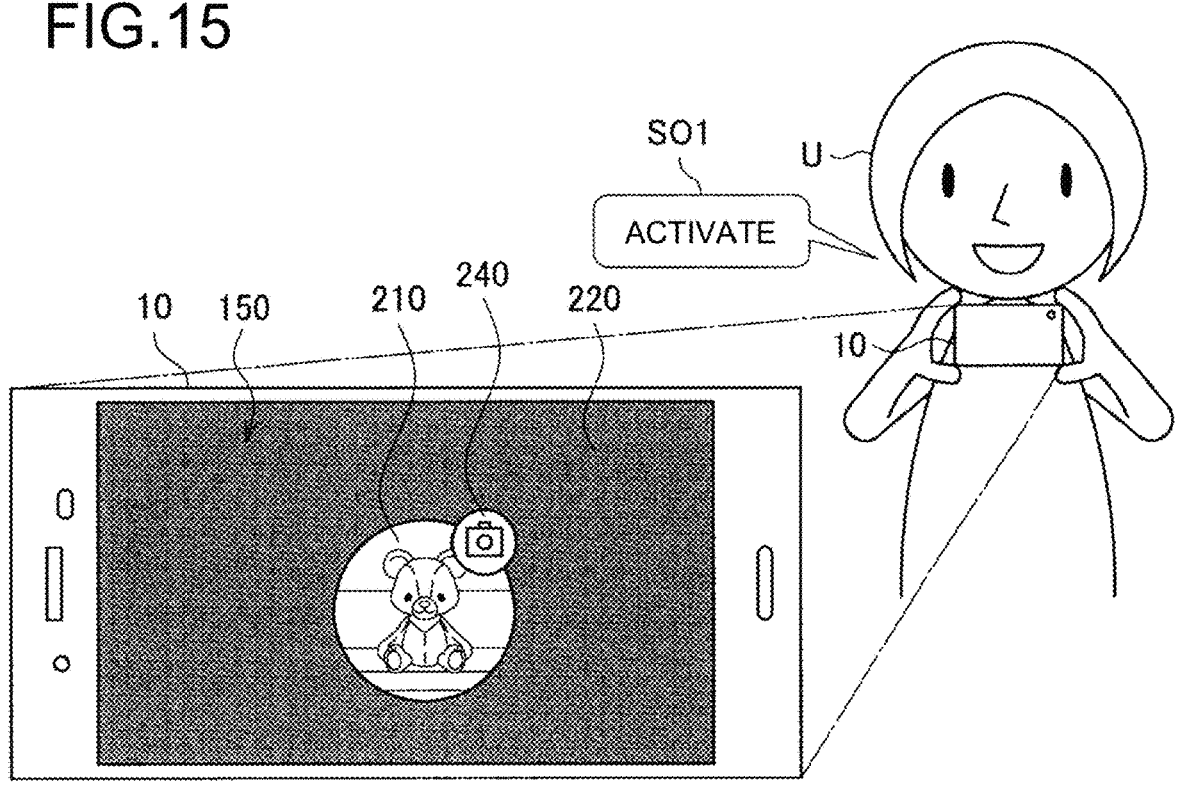
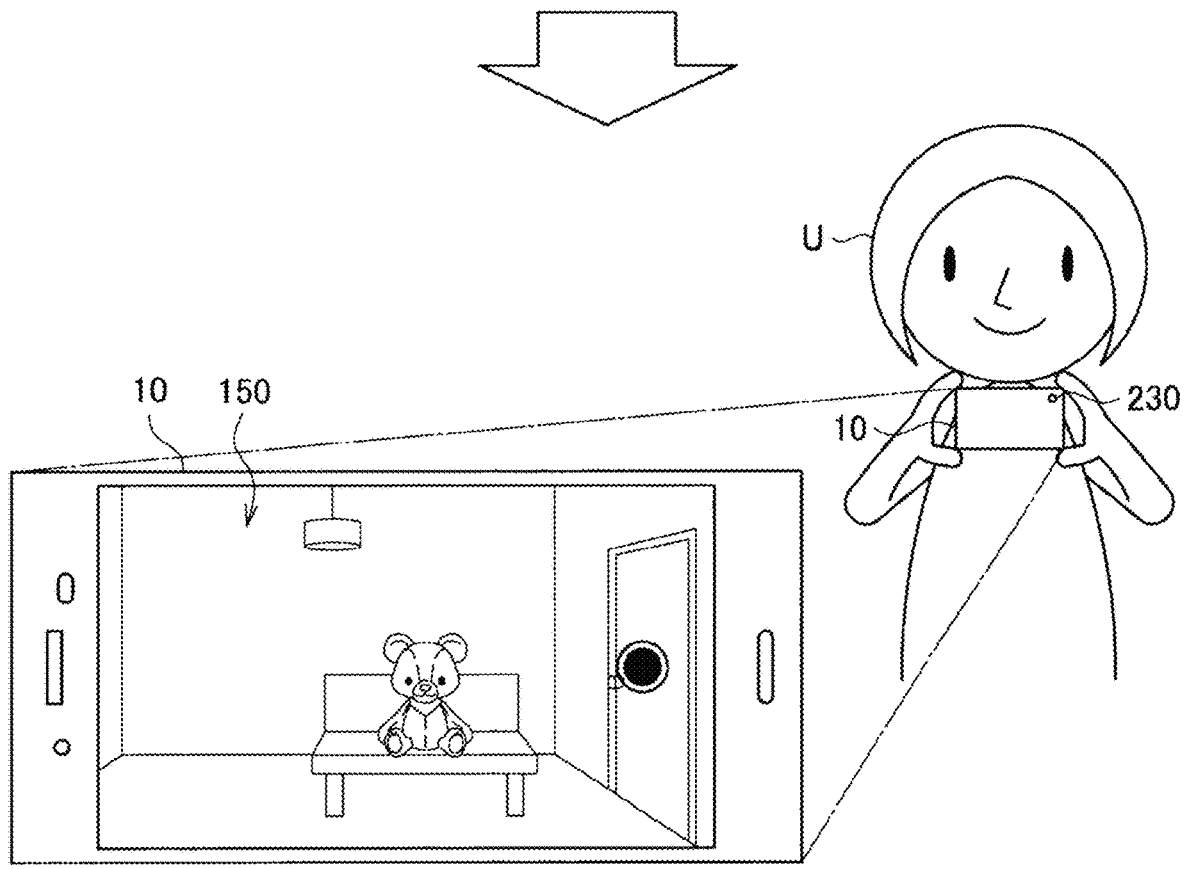

APPEARANCE CONFIGURATION OF INFORMATION PROCESSING TERMINAL

CROSS-REFERENCE TO RELATED APPLICATION

The present application is based on PCT filing PCT/JP2018/026928, filed Jul. 18, 2018, the entire contents of which are incorporated herein by reference.

FIELD

The present disclosure relates to an information processing apparatus, an information processing method, and a program.

BACKGROUND

In recent years, information processing apparatuses capable of proposing specific applications and contents to users, such as smartphones, have become widespread. For example, Patent Literature 1 discloses a technique of proposing a content to a user on the basis of use situations of other users.

CITATION LIST

Patent Literature

Patent Literature 1: JP 2015-220698 A

SUMMARY

Technical Problem

In a case of an information processing apparatus disclosed in Patent Literature 1, a content to be proposed is determined on the basis of use situations of other users. Thus, the content to be proposed is not always the content that each user may use.

Therefore, the present disclosure proposes an information processing apparatus, an information processing method, and a program that can propose an application corresponding to a situation of each user and improve user convenience in starting use of the application.

Solution to Problem

According to the present disclosure, an information processing apparatus is provided. The information processing apparatus includes: a display control unit configured to display, on a display screen, execution information related to execution of at least one application specified on the basis of a predetermined determination result; and a processing control unit configured to execute first processing in a case where the at least one application is specified, and execute second processing on the basis of a response of a user to the displayed execution information.

Moreover, according to the present disclosure, a method by using a processor is provided. The method includes: displaying, on a display screen, execution information related to execution of at least one application specified on the basis of a predetermined determination result; and executing first processing in a case where the at least one application is specified, and executing second processing on the basis of a response of a user to the displayed execution information.

Moreover, according to the present disclosure, a program is provided. The program causes a computer to function as an information processing apparatus including: a display control unit configured to display, on a display screen, execution information related to execution of at least one application specified on the basis of a predetermined determination result; and a processing control unit configured to execute first processing in a case where the at least one application is specified, and execute second processing on the basis of a response of a user to the displayed execution information.

Advantageous Effects of Invention

As described above, according to the present disclosure, there are provided an information processing apparatus, an information processing method, and a program that can propose an application corresponding to a situation of each user and improve user convenience in starting use of the application.

Note that the effects described above are not necessarily limitative, and any of the effects described in the present specification or other effects that can be grasped from the present specification may be exhibited in addition to or in place of the effects described above.

BRIEF DESCRIPTION OF DRAWINGS

FIG. 2 is a block diagram illustrating an example of a functional configuration of the information processing terminal 10 according to the present embodiment.

FIG. 4 illustrates an example related to starting use of a map application according to the embodiment.

FIG. 5 illustrates an example of an operation related to starting use of a music reproduction application according to the embodiment.

FIG. 6 illustrates an example of an operation related to cancellation processing of activation of a predetermined application according to the embodiment.

FIG. 7 illustrates an example of an operation related to cancellation processing of the predetermined application according to the embodiment.

FIG. 8 illustrates an example of an operation related to starting use of the predetermined application using an icon according to the embodiment.

FIG. 15 illustrates an example in which a user uses an utterance as a response of the user to execution information according to the embodiment.

DESCRIPTION OF EMBODIMENTS

Hereinafter, preferred embodiments of the present disclosure will be described in detail with reference to the accompanying drawings. Note that, in the present specification and the drawings, components having substantially the same functional configuration are denoted by the same reference signs, and a duplicate description will be omitted.

Note that the description will be made in the following order.

1. Appearance Configuration of Information Processing Terminal 10
2. Example of Functional Configuration of Information Processing Terminal 10
3. Specific Examples
4. Control Flow
5. Example of Hardware Configuration
6. Conclusion <1. Appearance Configuration of Information Processing Terminal 10>

Figure 1A:
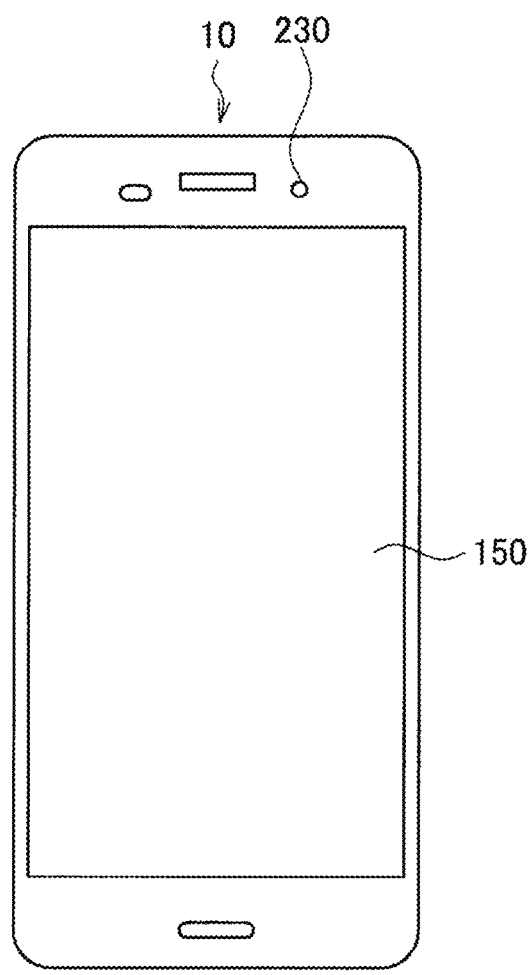
FIG. 1A illustrates a front side of an information processing terminal 10 of the present disclosure.
Figure 1B:
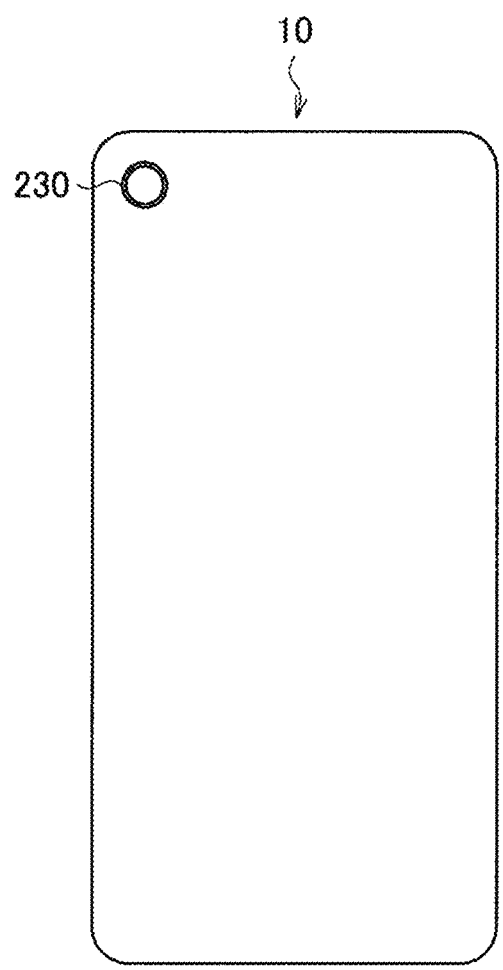
FIG. 1B illustrates a back side of the information processing terminal 10 of the present disclosure.

FIG. 1A illustrates a front side of an information processing terminal 10 of the present disclosure. As illustrated in FIG. 1, the information processing terminal 10 may be a smartphone, for example. The information processing terminal 10 includes, on a front side of a case, an input unit 130 to be described later and a display 150 overlaid on the input unit 130. With such a configuration, the information processing terminal 10 can receive a user input at the position of an operation body relative to a display screen displayed on the display 150. The information processing terminal 10 can use a so-called graphical user interface (GUI) to display, on the display 150, execution information related to execution of an application. In addition, the information processing terminal 10 can control contents of the display screen on the basis of the user input. In addition, FIG. 1B illustrates a back side of the information processing terminal 10 of the present disclosure. As illustrated in FIG. 1B, the information processing terminal 10 is provided with a camera 230 on a back side of the case. In addition, the information processing terminal 10 may be provided with the camera 230 on the front side of the case.

<2. Example of Functional Configuration of Information Processing Terminal 10>

Next, an example of a functional configuration of the information processing terminal 10 according to the present embodiment will be described. FIG. 2 is a block diagram illustrating the example of the functional configuration of the information processing terminal 10 according to the present embodiment. Referring to FIG. 2, the information processing terminal 10 according to the present embodiment includes a sensor unit 110, a storage unit 120, the input unit 130, an operation detection unit 140, the display 150, a display control unit 160, a specification unit 170, a communication unit 180, and a processing control unit 190.

(Sensor Unit 110)

The sensor unit 110 according to the present embodiment has a function of collecting, using various sensors, sensor information related to an action of a user. The sensor unit 110 includes, for example, an acceleration sensor, a gyro sensor, a geomagnetic sensor, a vibration sensor, and a global navigation satellite system (GNSS) signal reception device.

(Storage Unit 120)

The storage unit 120 according to the present embodiment is a storage area for temporarily or constantly storing various programs and data. For example, the storage unit 120 may store programs and data for the information processing terminal 10 to execute various functions. As a specific example, the storage unit 120 may store programs for executing various applications and management data for managing various settings. Needless to say, the above is merely an example, and the type of data stored in the storage unit 120 is not particularly limited.

(Input Unit 130)

The input unit 130 according to the present embodiment has a function of recognizing various device operations by a user. The device operation described above includes, for example, a touch operation and insertion of an earphone terminal into the information processing terminal 10. Here, the touch operation means various contact operations to the display 150, such as a tap, a double tap, a swipe, and a pinch. In addition, the touch operation includes, for example, an operation of bringing an object such as a finger closer to the display 150. As described above, the input unit 130 includes, for example, a touch panel overlaid on the display 150 and a proximity sensor. In addition, the input unit 130 may include a microphone for collecting sound information such as an utterance by the user.

(Operation Detection Unit 140)

The operation detection unit 140 according to the present embodiment detects a predetermined operation of a user on the information processing terminal 10. Specifically, the operation detection unit 140 detects a predetermined operation among device operations recognized by the input unit 130. The predetermined operation means, for example, a touch operation on a predetermined position on a display screen displayed on the display 150, an utterance of a predetermined phrase by the user, and insertion of an earphone terminal into the information processing terminal 10.

(Display 150)

The display 150 according to the present embodiment has a function of outputting, under control of the display control unit 160 to be described later, visual information such as a moving image or text and information related to an application. The display 150 according to the present embodiment includes a display device that presents the visual information. Examples of the display device described above include a liquid crystal display (LCD) device and an organic light emitting diode (OLED) display device.

(Display Control Unit 160)

The display control unit 160 according to the present embodiment has a function of controlling display on the display 150. The display control unit 160 according to the present embodiment has, for example, a function of causing execution information related to execution of an application specified by the specification unit 170 to be described later and a screen during execution of the application to be displayed on the display 150. Here, the execution information means, for example, visual information indicating an execution state of the application. With the function described above of the display control unit 160 according to the present embodiment, it is possible to propose an application corresponding to a situation of each user and improve user convenience in starting use of the application.

In addition, the display control unit 160 according to the present embodiment may cause a part of a screen of the application to be displayed on the display 150. Here, the part of the screen of the application is a cutout image of the application, a part of a screen during execution of the application, or the like, and may be flexibly determined in accordance with various applications. Here, the screen during execution may be an initial screen after activation of the application or a screen after execution of predetermined processing other than activation processing. In addition, here, the display control unit 160 may cause the part of the screen of the application to be output to the display 150 by causing a moving image belonging to a layer higher than the screen of the application to be displayed at the same time on the display 150. In addition, in a case where the operation detection unit 140 detects a response of the user to the part of the screen of the application, the display control unit 160 may cause the entire screen of the application to be output to the display 150.

In addition, the display control unit 160 according to the present embodiment may cause an icon related to the application to be displayed on the display 150. In addition, similarly, in a case where the operation detection unit 140 detects a response of the user to the icon related to the application, the display control unit 160 may cause the entire screen of the application to be displayed on the display 150.

(Specification Unit 170)

The specification unit 170 according to the present embodiment specifies a predetermined application on the basis of a predetermined determination result. Here, the predetermined determination result means a determination result based on an action of a user, for example, operation information related to the user determined from sensor information collected by the sensor unit 110 or a device operation by the user, which is recognized by the input unit 130. In addition, the predetermined determination result includes, for example, setting information related to the predetermined application, such as a travel schedule. Hereinafter, the specific description will be made. For example, in a case where the user holds the information processing terminal 10 laterally, the specification unit 170 recognizes that the user U holds the information processing terminal 10 laterally on the basis of sensor information output from the sensor unit 110. Then, the specification unit 170 according to the present embodiment may specify a camera application on the basis of the sensor information.

Furthermore, the specification unit 170 according to the present embodiment may specify a predetermined application using a model constructed by machine learning of sensor information collected by the sensor unit 110 or an operation by the user, which is recognized by the input unit 130. For example, the machine learning may use a neural network such as deep learning. Note that the constructed model can be stored in the storage unit 120.

(Communication Unit 180)

The communication unit 180 according to the present embodiment executes communication with another device via a network 20 to be described later. For example, the communication unit 180 may acquire various data (for example, data related to an application) transmitted from another device. In addition, the communication unit 180 may transmit various data to another device via the network 20 to be described later.

(Processing Control Unit 190)

The processing control unit 190 according to the present embodiment has a function of executing processing related to an application specified by the specification unit 170. With the function described above of the processing control unit 190 according to the present embodiment, it is possible to propose an application corresponding to a situation of each user to the user and improve user convenience in starting use of the application.

The processing control unit 190 according to the present embodiment may execute, for example, first processing in a case where the specification unit 170 specifies a predetermined application. Here, the first processing means activation preparation processing for the application, bringing the application into a background state, and the like. Here, the activation preparation processing means preparation processing for shortening the time it takes to activate an application compared to the time it takes to normally activate the application, for example, reading setting value information related to the application by the processing control unit 190.

In addition, the processing control unit 190 according to the present embodiment may execute, for example, second processing on the basis of a response of the user to execution information related to an application caused to be displayed on the display 150 by the display control unit 160. Here, the response of the user means that the user performs various device operations on the information processing terminal 10. In addition, here, the second processing means activation processing related to the application on which the activation preparation processing has been executed, bringing the application in the background state into a foreground state, and the like.

(Network 20)

The network 20 has a function of connecting configurations included in an information processing system. The network 20 may include a public network such as the Internet, a telephone network, or a satellite communication network, and various local area networks (LANs) or wide area networks (WANs) including Ethernet (registered trademark). In addition, the network 20 may include a dedicated network such as an internet protocol-virtual private network (IP-VPN). In addition, the network 20 may include a wireless communication network such as Wi-Fi (registered trademark) or Bluetooth (registered trademark).

In addition, the processing control unit 190 according to the present embodiment has a function of controlling each configuration included in the information processing terminal 10. The processing control unit 190 controls, for example, activation and stop of each configuration.

The example of the functional configuration of the information processing terminal 10 according to the present embodiment has been described above. Note that the functional configuration described above with reference to FIG. 2 is merely an example, and the functional configuration of the information processing terminal 10 according to the present embodiment is not limited to such an example. For example, the information processing terminal 10 does not necessarily have to include all of the configurations illustrated in FIG. 2. The storage unit 120, the operation detection unit 140, the display control unit 160, the specification unit 170, and the processing control unit 190 can be included in another device different from the information processing terminal 10. The functional configuration of the information processing terminal 10 according to the present embodiment can be flexibly modified in accordance with a specification or operation.

In addition, the functions of the components may be implemented by an arithmetic device such as a central processing unit (CPU) reading a control program from a storage medium such as a read only memory (ROM) or a random access memory (RAM) storing the control program in which a processing procedure for implementing these functions is described, and interpreting and executing the program. Thus, it is possible to appropriately change a configuration to be used in accordance with a technical level at the time of implementing the present embodiment. In addition, an example of a hardware configuration of the information processing terminal 10 will be described later.

<3. Specific Examples>

Figure 3:
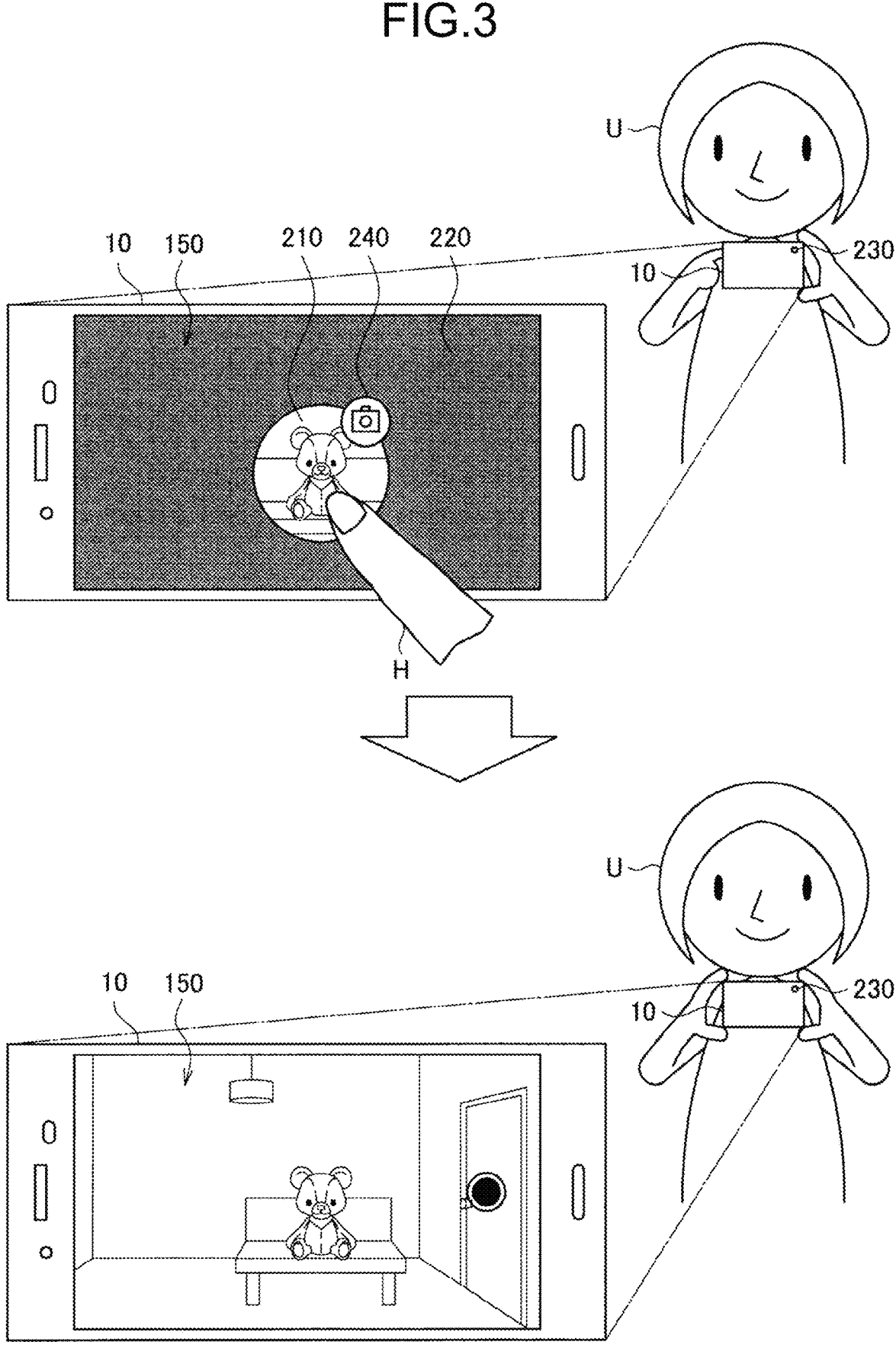
FIG. 3 illustrates an example of an operation related to starting use of an application according to the embodiment.

Next, the control by the display control unit 160 and the processing control unit 190 according to the present embodiment will be described in detail with specific examples. FIG. 3 illustrates an example of an operation related to starting use of an application according to the present embodiment. The upper part of FIG. 3 illustrates a user U holding the information processing terminal 10 laterally. Here, on the display 150, a part 210 of a screen of the camera application, an operation end area 220, and an icon 240 related to the application are displayed. Here, the operation end area 220 is an area in which the processing control unit 190 executes cancellation processing related to the first processing in a case where the user U executes a touch operation on the input unit 130, as described later. In the lower part of FIG. 3, the entire screen of the camera application is displayed on the display 150.

In the upper part of FIG. 3, in a case where the specification unit 170 specifies the camera application by the user U on the basis of a predetermined determination result, the processing control unit 190 according to the present embodiment executes activation processing of the camera application. Then, the display control unit 160 according to the present embodiment causes the part 210 of the screen of the predetermined application to be displayed on the display 150. In addition, the display control unit 160 may cause the icon 240 related to the application to be displayed as execution information on the display 150, as in the example of FIG. 3.

In the example illustrated in the upper part of FIG. 3, the sensor unit 110 collects, as sensor information, an operation of the user U to try to hold the information processing terminal 10 laterally. Then, the specification unit 170 according to the present embodiment specifies the camera application on the basis of the sensor information. Then, on the basis of the specification by the specification unit 170, the processing control unit 190 according to the present embodiment executes the activation processing of the camera application and also executes activation processing of the camera 230 provided in the information processing terminal 10. In addition, the display control unit 160 according to the present embodiment causes the part 210 of an object to be captured by the camera 230 to be displayed on the display 150. Here, the user U uses, for example, a hand H of the user U to perform a touch operation on the part 210 of the object to be captured by using the camera application, which is displayed on the display 150. In addition, in a case where the sensor unit 110 collects, as sensor information, an operation of the user U to hold the information processing terminal 10 vertically, the specification unit 170 may specify the camera application on the basis of the sensor information. At that time, the processing control unit 190 may execute the activation processing of the camera 230 provided on the front side of the information processing terminal 10.

In the lower part of FIG. 3, in a case where the operation detection unit 140 detects a device operation by the user U on the part 210 of the screen of the predetermined application, the display control unit 160 according to the present embodiment causes the entire screen of the predetermined application to be displayed on the display 150. Here, the display control unit 160 may gradually widen the range of the part 210 of the screen of the displayed application so as to cause the entire screen of the application to be displayed on the display 150 in the end. In addition, here, the processing control unit 190 according to the present embodiment may execute the second processing.

In the example illustrated in the lower part of FIG. 3, the display control unit 160 according to the present embodiment causes the entire screen of the camera application to be displayed on the display 150 in response to a touch operation of the user U on the part 210 of the screen.

As described above, with the display control unit 160 and the processing control unit 190 according to the present embodiment, execution information related to execution of the specified application is displayed on a display screen. Then, on the basis of a response of a user to the part 210 of the screen of the displayed application, the display control unit 160 can cause the entire screen of the application to be displayed on the display 150. With such a function, it is possible to shorten the time it takes for the user to start using the application, and to prevent erroneous ignition of processing by the application.

The example in which the camera application is proposed has been described above. However, an application to be proposed may be another type of application. For example, FIG. 4 illustrates an example related to starting use of a map application according to the present embodiment. The upper part of FIG. 4 illustrates the display 150 on which a part 210 of a screen of the map application and an operation end area 220 are displayed. In addition, the user U uses the hand H of the user U to perform a touch operation on the part 210 of the screen of the map application, which is displayed on the display 150. In the lower part of FIG. 4, the entire screen of the map application is displayed on the display 150.

In the upper part of FIG. 4, the specification unit 170 according to the present embodiment specifies the map application on the basis of sensor information collected by the sensor unit 110 or a device operation by the user U, which is recognized by the input unit 130. Then, the processing control unit 190 according to the present embodiment executes activation processing of the map application. Here, the processing control unit 190 may cause the map application to execute predetermined processing such as a route search for a destination. In addition, the display control unit 160 according to the present embodiment causes the part 210 of the screen of the map application to be displayed on the display 150. Here, a predetermined determination result may include a determination result as to whether or not the user U is likely to move to a predetermined location on the basis of, for example, setting information such as a travel schedule set in the information processing terminal 10 or current position information of the information processing terminal 10 acquired by the sensor unit 110. In addition, the part 210 of the screen may be, for example, map information around the current position of the information processing terminal 10, or map information around a destination set in the travel schedule set in the information processing terminal 10.

In the lower part of FIG. 4, in a case where the operation detection unit 140 detects a touch operation by the user U on the part 210 of the screen of the map application, the display control unit 160 according to the present embodiment causes the entire screen of the map application to be displayed on the display 150. Here, the processing control unit 190 according to the present embodiment may execute the second processing.

As described above, with the display control unit 160 and the processing control unit 190 according to the present embodiment, execution information related to execution of the specified map application is displayed on a display screen. Then, on the basis of a response of a user to the execution information, the display control unit 160 can cause the entire screen of the map application to be displayed on the display 150. With such a function, it is possible to shorten the time it takes for the user to start using the map application, and to prevent erroneous ignition of activation processing of the map application.

In addition, FIG. 5 illustrates an example of an operation related to starting use of a music reproduction application according to the present embodiment. The upper part of FIG. 5 illustrates the display 150 on which a part 210 of a screen of the music reproduction application and an operation end area 220 are displayed. In the upper part of FIG. 5, the user U uses the hand H of the user U to perform a touch operation on the part 210 of the screen displayed on the display 150. In the lower part of FIG. 5, the entire screen of the music reproduction application is displayed on the display 150.

In the upper part of FIG. 5, the specification unit 170 according to the present embodiment specifies the music reproduction application on the basis of sensor information collected by the sensor unit 110 or a device operation by the user U, which is recognized by the input unit 130. Then, the processing control unit 190 according to the present embodiment executes activation processing of the music reproduction application. In addition, the display control unit 160 according to the present embodiment causes the part 210 of the screen of the music reproduction application to be displayed on the display 150. Here, the part 210 of the screen of the music reproduction application may be, for example, information related to a predetermined piece of music. In addition, here, a predetermined determination result may include, for example, a determination result as to whether or not the operation detection unit 140 has recognized insertion of an earphone terminal into the information processing terminal 10, a determination result as to whether or not the operation detection unit 140 has completed wireless communication connection between a wireless earphone and the information processing terminal 10, or a determination result as to whether or not the specification unit 170 is driving an automobile or moving by a train on the basis of the sensor information output from the sensor unit 110.

In the lower part of FIG. 5, in a case where the operation detection unit 140 detects a touch operation by the user U on the part 210 of the screen of the music reproduction application, the display control unit 160 according to the present embodiment causes the entire screen of the music reproduction application to be displayed on the display 150. At this time, the processing control unit 190 according to the present embodiment may execute, as the second processing, reproduction processing of a predetermined piece of music, for example.

As described above, with the display control unit 160 and the processing control unit 190 according to the present embodiment, execution information related to execution of the specified music reproduction application is displayed on a display screen. Then, on the basis of a response of a user to the execution information related to the execution of the displayed music reproduction application, the display control unit 160 can cause the entire screen of the music reproduction application to be displayed on the display 150. With such a function, it is possible to eliminate the need for the user to search for a favorite piece of music, and to prevent erroneous ignition of processing by the music reproduction application.

The case has been described above in which the display control unit 160 causes the entire screen of a displayed predetermined application to be displayed on the display 150 in response to the response of the user U. On the other hand, in a case where the user U does not wish to use the application, the processing control unit 190 may end the application on the basis of a device operation by the user U. For example, FIG. 6 illustrates an example of an operation related to cancellation processing of activation of a predetermined application according to the present embodiment. The upper part of FIG. 6 illustrates the display 150 on which a part 210 of a screen of the camera application and an operation end area 220 are displayed. In addition, the upper part of FIG. 6 illustrates the hand H of the user U performing a touch operation on the operation end area 220 displayed on the display 150. In the lower part of FIG. 6, a lock screen of the information processing terminal 10 is displayed on the display 150.

In the upper part of FIG. 6, the processing control unit 190 according to the present embodiment executes the first processing related to a predetermined application specified by the specification unit 170. In addition, the display control unit 160 according to the present embodiment causes the part 210 of the screen of the predetermined application to be displayed on the display 150. Here, the user U is performing a touch operation on the operation end area 220.

In the lower part of FIG. 6, in a case where the user U performs a touch operation on the operation end area 220, the processing control unit 190 according to the present embodiment executes cancellation processing related to the first processing, for example, end processing of the application. In addition, here, the display control unit 160 according to the present embodiment executes cancellation processing of display of execution information related to the application, for example, processing of causing the lock screen of the information processing terminal 10 to be displayed on the display 150.

As described above, with the display control unit 160 and the processing control unit 190 according to the present embodiment, execution information related to execution of the specified predetermined application is displayed on a display screen. Then, on the basis of a response of a user to the displayed operation end area 220, the processing control unit 190 can execute cancellation processing related to the first processing. With such a function, even in a case where the user does not wish to use the proposed application, the application can be easily ended.

The example has been described above in which the processing control unit 190 performs cancellation processing of activation of the application by an operation of the user U in a case where the user U does not wish to use the application. However, the processing control unit 190 according to the present embodiment may execute cancellation processing related to an application corresponding to a lapse of a predetermined time. For example, FIG. 7 illustrates an example of an operation related to cancellation processing of a predetermined application according to the present embodiment. The upper part of FIG. 7 illustrates the display 150 on which a part 210 of a screen of the camera application and an operation end area 220 are displayed. In the lower part of FIG. 7, the lock screen of the information processing terminal 10 is displayed on the display 150.

In the upper part of FIG. 7, the processing control unit 190 according to the present embodiment executes the first processing related to a predetermined application specified by the specification unit 170. In addition, the display control unit 160 according to the present embodiment causes the part 210 of the screen of the predetermined application to be displayed on the display 150.

In the lower part of FIG. 7, in a case where the operation detection unit 140 according to the present embodiment does not detect an operation by the user U on the information processing terminal 10 within a predetermined time, the processing control unit 190 according to the present embodiment executes cancellation processing related to the first processing. In the example illustrated in the lower part of FIG. 7, since the operation by the user U on the information processing terminal 10 is not detected for 5 seconds, the processing control unit 190 executes end processing of the camera application and the camera 230.

As described above, with the display control unit 160 and the processing control unit 190 according to the present embodiment, it is possible to display execution information related to execution of the specified predetermined application on a display screen, and to execute cancellation processing related to the first processing on the basis of a response of a user to the displayed operation end area 220. With such a function, in the information processing terminal 10 according to the present embodiment, the application can be easily ended even in a case where the user does not wish to use the proposed application.

The example has been described above in which a part of a screen of an application is displayed as execution information related to the application. However, execution information related to an application may be, for example, an icon related to the application instead of a part of a screen of the application. For example, FIG. 8 illustrates an example of an operation related to starting use of a predetermined application using an icon according to the present embodiment. The upper part of FIG. 8 illustrates the display 150 on which an icon 240 of a screen of the camera application and an operation end area 220 are displayed. In the lower part of FIG. 8, the lock screen of the information processing terminal 10 is displayed on the display 150.

Figure 9:
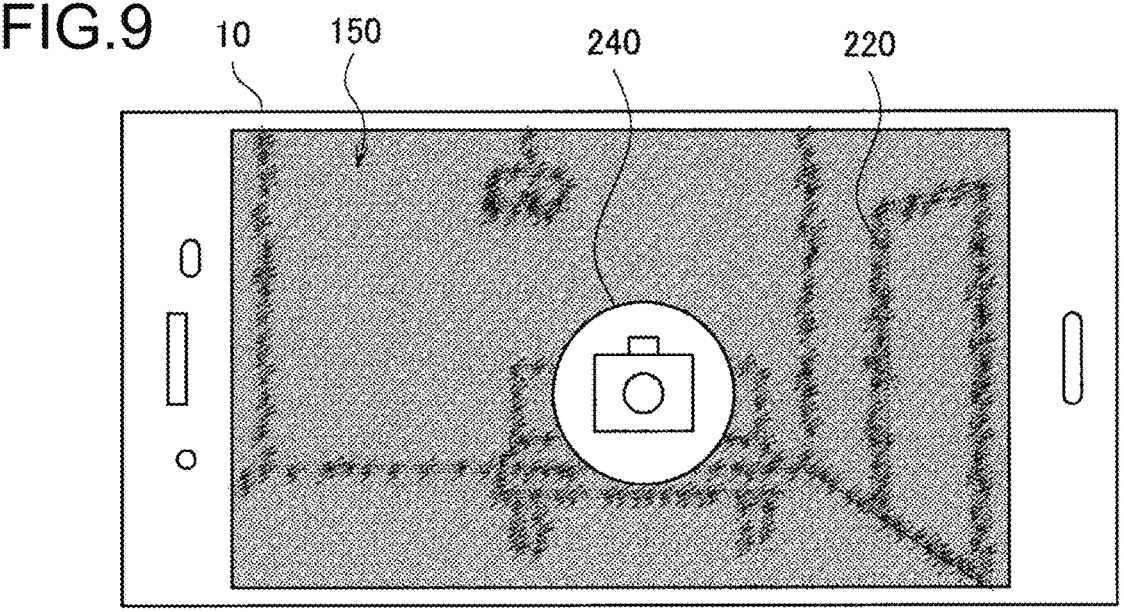
FIG. 9 illustrates an example of an operation related to starting use of the predetermined application using the icon according to the embodiment.

In addition, the example of the case has been described above in which the operation end area 220 related to cancellation processing of an application is displayed in a single black color. However, other information may be displayed in the operation end area 220. For example, FIG. 9 illustrates an example of an operation related to starting use of a predetermined application by using an icon according to the present embodiment. FIG. 9 illustrates the display 150 on which an icon 240 of a screen of the camera application and an operation end area 220 are displayed.

In FIG. 9, the processing control unit 190 according to the present embodiment executes activation processing of the camera application specified by the specification unit 170. The processing control unit 190 according to the present embodiment also executes activation processing of the camera 230 provided in the information processing terminal 10. Here, the display control unit 160 according to the present embodiment may cause the icon 240 of the screen of the predetermined application and, as the operation end area 220, an image being captured by the camera 230, on which blurring processing is executed by the display control unit 160 or the camera application, to be displayed on the display 150.

In the example illustrated in FIG. 9, in a case where the operation detection unit 140 detects a touch operation by the user U on the operation end area 220, the processing control unit 190 according to the present embodiment executes cancellation processing related to the first processing.

Figure 10:
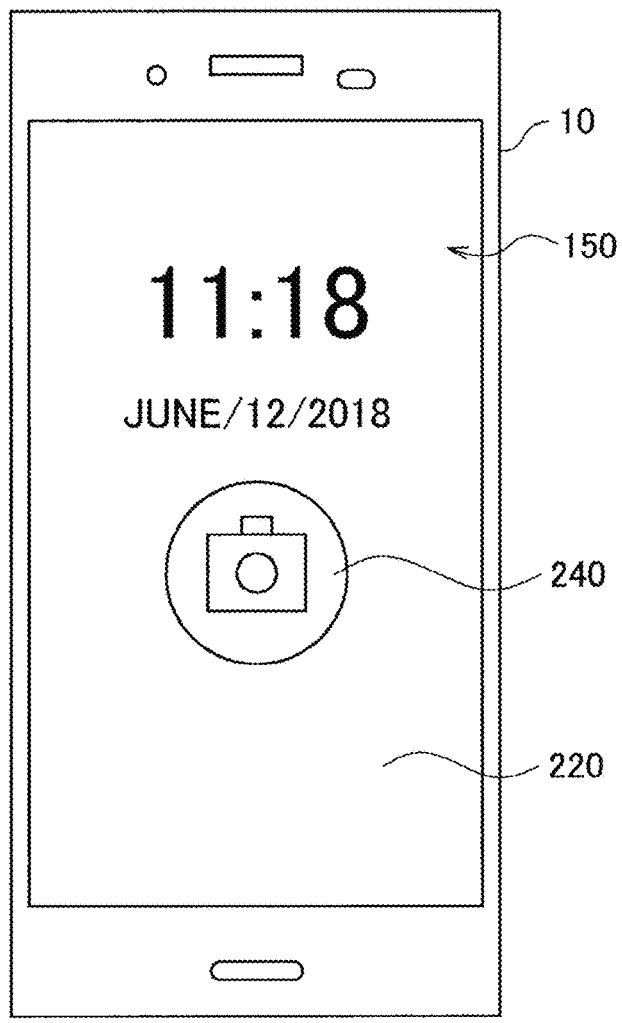
FIG. 10 illustrates an example of display related to application proposal on a lock screen according to the embodiment.

In addition, FIG. 10 illustrates an example of display related to application proposal on the lock screen according to the present embodiment. FIG. 10 illustrates the display 150 on which a part 210 of a screen of the camera application and the lock screen serving as an operation end area 220 are vertically displayed. In the example illustrated in FIG. 10, the display control unit 160 according to the present embodiment causes the icon 240 related to the camera application on the lock screen to be displayed on the display 150. In the display control unit 160 according to the present embodiment, for example, in a case where the operation detection unit 140 detects a touch operation by the user U on the lock screen serving as the operation end area 220, the processing control unit 190 according to the present embodiment may execute cancellation processing related to the first processing.

Figure 11:
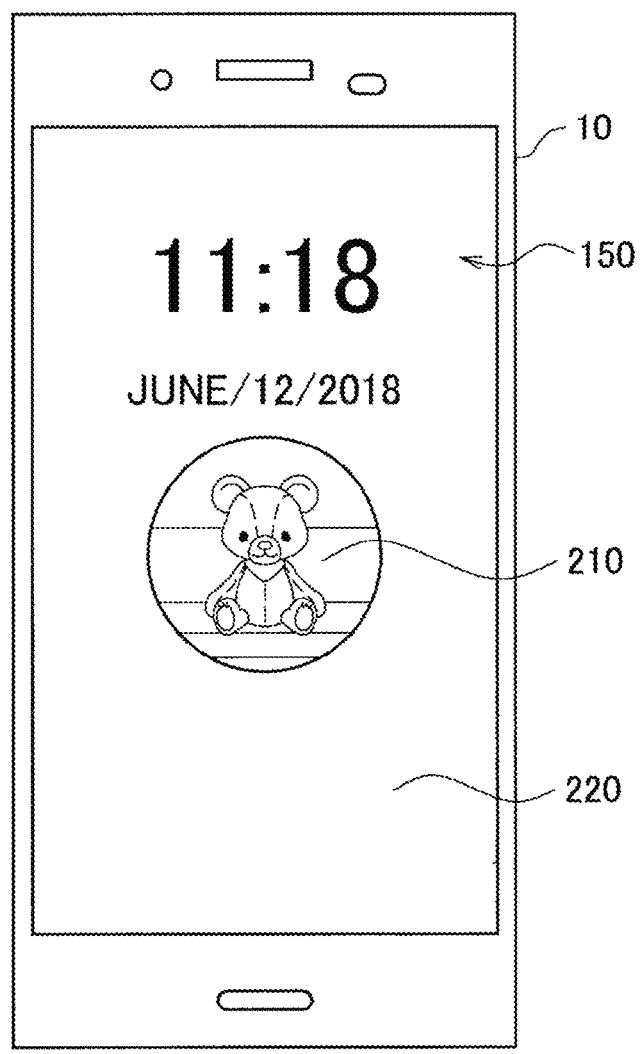
FIG. 11 illustrates an example of display related to application proposal on the lock screen according to the embodiment.

In addition, FIG. 11 illustrates an example of display related to application proposal on the lock screen according to the present embodiment. In the example illustrated in FIG. 11, the display control unit 160 according to the present embodiment causes a part 210 of a screen of the camera application to be displayed on the display 150 in such a way that the part 210 is shown on the lock screen. In the display control unit 160 according to the present embodiment, in a case where the operation detection unit 140 detects a touch operation by the user U on the lock screen serving as an operation end area 220, the processing control unit 190 according to the present embodiment may execute cancellation processing related to the first processing.

As described above, with the functions related to the display control unit 160 and the processing control unit 190 according to the present embodiment, it is possible to propose an application by using a screen configuration that suits a use situation and preference of each user.

Figure 12:
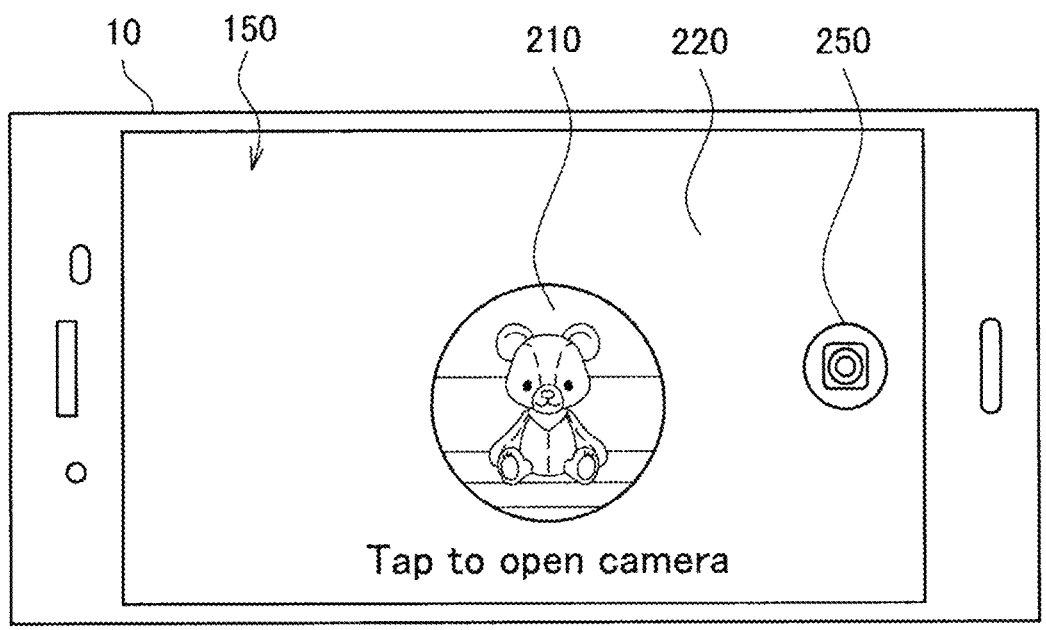
FIG. 12 illustrates an example related to an image capturing operation of a camera application according to the embodiment.

The example has been described above in which an application can be operated in accordance with a response of a user to execution information related to the application. However, in accordance with the response of the user to the execution information related to the application, predetermined processing related to the application may be executed. For example, FIG. 12 illustrates an example related to an image capturing operation of the camera application according to the present embodiment. FIG. 12 illustrates the display 150 on which a part 210 of a screen of the camera application, an operation end area 220, and an image capturing execution area 250 are displayed.

In the example illustrated in FIG. 12, the specification unit 170 according to the present embodiment specifies the camera application. Then, the processing control unit 190 according to the present embodiment executes activation processing of the camera application. In addition, the processing control unit 190 according to the present embodiment also executes activation processing of the camera 230 provided in the information processing terminal 10. At this time, the display control unit 160 according to the present embodiment causes a part 210 of an object to be captured by the camera 230 using the camera application, the operation end area 220, and the image capturing execution area 250 to be displayed on the display 150.

The processing control unit 190 according to the present embodiment causes the camera application to execute image capturing processing on the basis of a response of the user to the image capturing execution area 250. Specifically, on the basis of the response of the user, the processing control unit 190 causes the entire screen of the camera application to be displayed, and then automatically causes the camera application to execute the image capturing processing by the camera. In the example illustrated in FIG. 12, for example, in a case where the user U executes a touch operation on the image capturing execution area 250 and the operation detection unit 140 detects the touch operation, the processing control unit 190 executes the image capturing processing by the camera. Here, the display control unit 160 may cause the entire screen of the camera application to be displayed on the display 150 before the execution of the image capturing processing.

Figure 13:
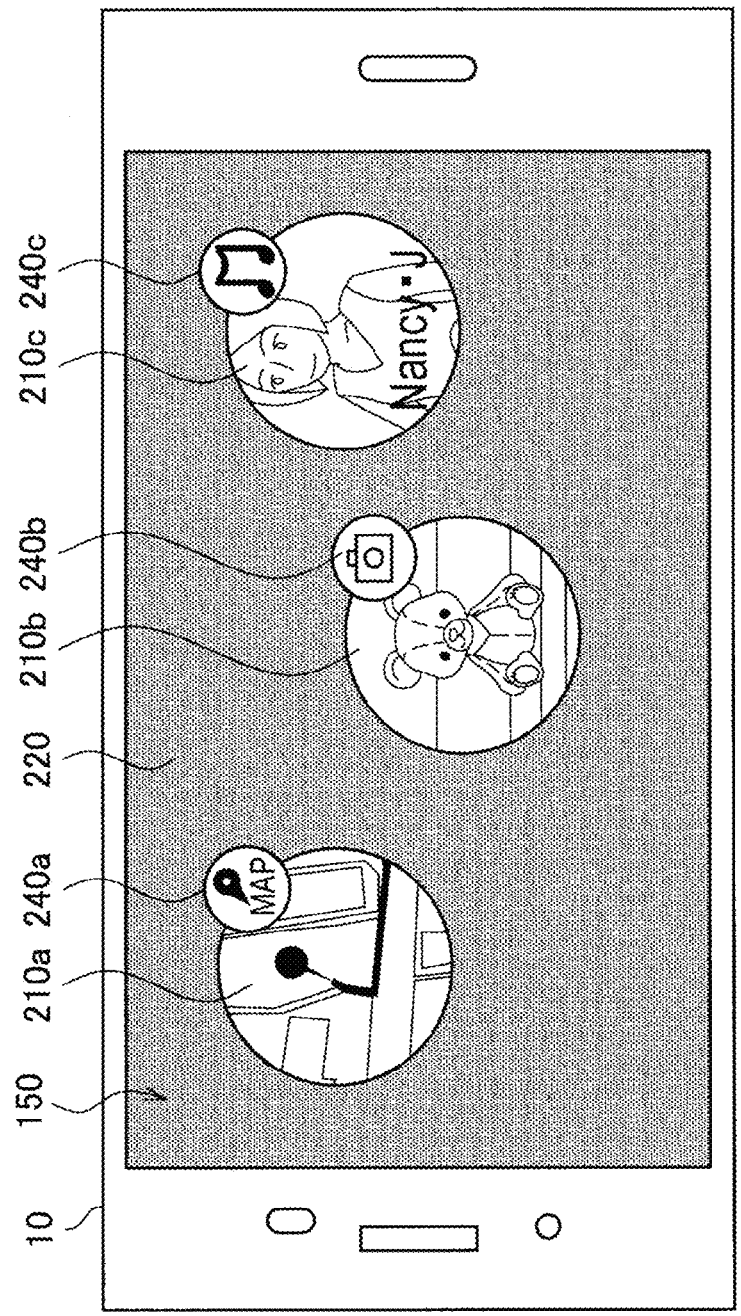
FIG. 13 illustrates an example related to starting use of a plurality of types of applications according to the embodiment.

The example has been described above in which one type of application is proposed. However, two or more types of applications may be proposed simultaneously. For example, FIG. 13 illustrates an example related to starting use of a plurality of types of applications according to the present embodiment. FIG. 13 illustrates the display 150 on which parts 210a, 210b, and 210c of screens of a plurality of types of applications and an operation end area 220 are displayed. In addition, FIG. 13 illustrates icons 240a, 240b, and 240c corresponding to the applications displayed on the display 150.

In FIG. 13, in a case where the specification unit 170 specifies a plurality of applications by the user U on the basis of a predetermined determination result, the processing control unit 190 according to the present embodiment executes the first processing related to the plurality of applications. Then, the display control unit 160 according to the present embodiment causes the parts 210a, 210b, and 210c of the screens of the plurality of applications to be displayed on the display 150. Here, the parts 210a, 210b, and 210c of the screens are cutout images each related to an execution screen of the corresponding application.

In the example illustrated in FIG. 13, the specification unit 170 according to the present embodiment specifies the camera application, the map application, and the music reproduction application on the basis of sensor information collected by the sensor unit 110 and a device operation by the user U, which is recognized by the input unit 130. At that time, the processing control unit 190 according to the present embodiment executes the first processing related to each of the applications described above. In a case where a touch operation is performed by the user U on the part 210a, 210b, or 210c of the screen described above, the display control unit 160 according to the present embodiment causes the entire screen of the application corresponding to the target of the operation to be displayed on the display 150. Here, the processing control unit 190 according to the present embodiment may execute the second processing.

As described above, with the functions related to the display control unit 160 and the processing control unit 190 according to the present embodiment, even in a case where there is a plurality of applications to be specified, it is possible to propose the applications without impairing convenience in starting use of the applications.

Figure 14:
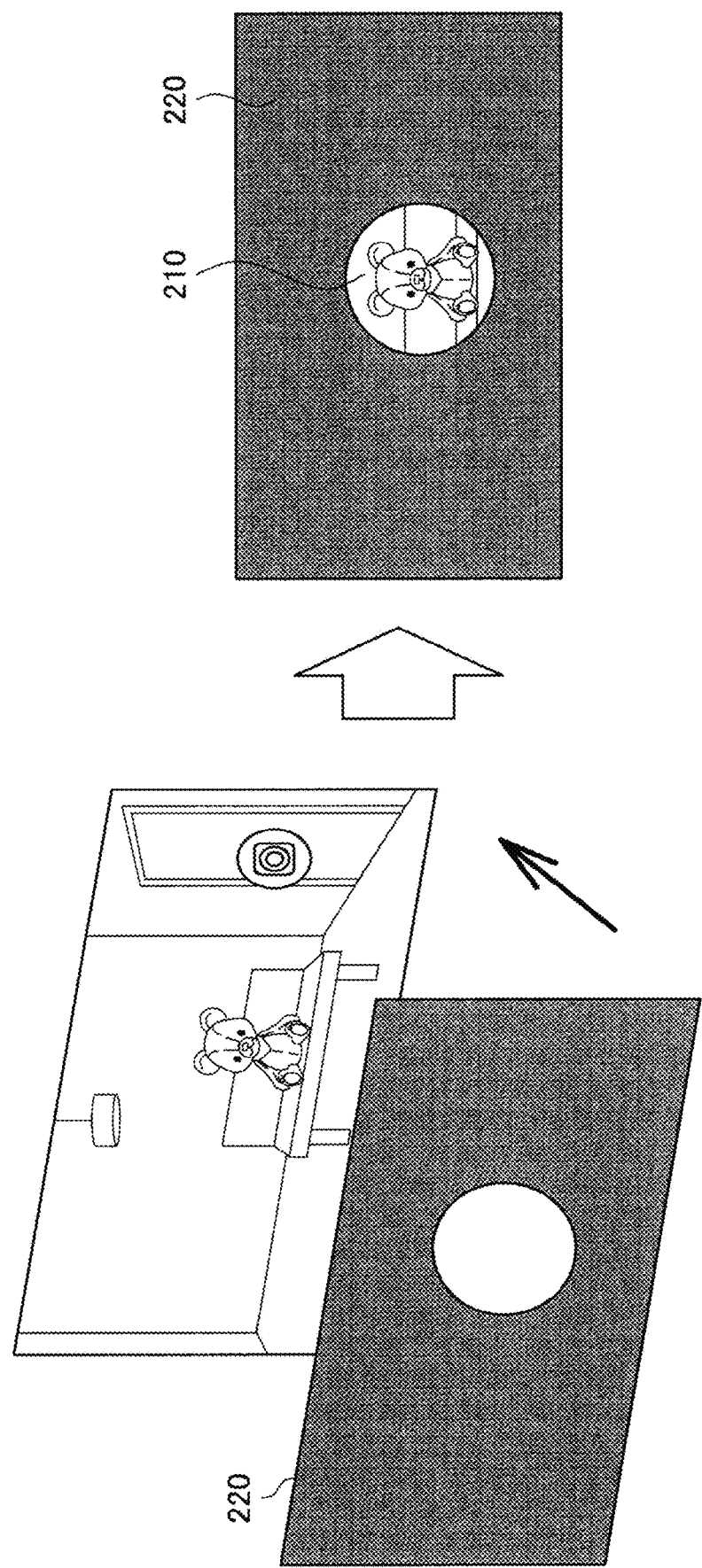
FIG. 14 illustrates an example of control for causing a part 210 of a screen of an application to be displayed on a display 150 according to the embodiment.

Next, an example of control in which the display control unit 160 according to the present embodiment causes a part 210 of a screen of an application to be displayed on the display 150 will be described with reference to FIG. 14. FIG. 14 illustrates an example of the control for causing the part 210 of the screen of the application to be displayed on the display 150 according to the present embodiment. The left part of FIG. 14 illustrates the entire screen of the application and the operation end area 220, display of the entire screen and the operation end area 220 being controlled by the display control unit 160. The right part of FIG. 14 illustrates the part 210 of the screen of the application and the operation end area 220.

As illustrated on the left part of FIG. 14, the entire screen of the application and an operation end area 220 are separate pieces of information. Specifically, the display control unit 160 controls the display 150 such that the entire screen of the application and the operation end area 220 are displayed on different layers.

In addition, as illustrated on the right part of FIG. 14, the operation end area 220 is an image belonging to a layer higher than the entire screen of the application. As described above, by exercising control such that the entire screen of the application and the image are displayed on the display 150, the display control unit 160 according to the present embodiment can cause the part 210 of the screen of the application to be displayed to the user U.

Note that the display of the part 210 of the screen of the application is not limited to such an example. In relation to an application that has not been activated, the display control unit 160 according to the present embodiment may cause a cutout image of an execution screen related to the application to be displayed as execution information on the display 150, for example. Here, the cutout image of the execution screen related to the application may be stored in the storage unit 120 in advance.

The example has been described above in which a touch operation on the display 150 is used as a response of a user to execution information related to the application displayed on the display 150. However, an utterance by the user may be used as the response of the user to the execution information. For example, FIG. 15 illustrates an example in which a user uses an utterance as a response of the user to execution information according to the present embodiment. The upper part of FIG. 15 illustrates the user U holding the information processing terminal 10 laterally. Here, a part 210 of a screen of the camera application and an operation end area 220 are displayed on the display 150. In the lower part of FIG. 15, the entire screen of the camera application is displayed on the display 150.

In the upper part of FIG. 15, in a case where the specification unit 170 specifies the camera application on the basis of a predetermined determination result, the processing control unit 190 according to the present embodiment executes activation processing of the camera application. Then, the display control unit 160 according to the present embodiment causes the part 210 of the screen of the predetermined application to be displayed on the display 150. In addition, the user U is executing an utterance of a predetermined phrase.

In the example illustrated in the upper part of FIG. 15, the sensor unit 110 outputs sensor information generated by an operation of the user U to try to hold the information processing terminal 10 laterally. Then, the specification unit 170 according to the present embodiment specifies the camera application on the basis of the sensor information. Then, the processing control unit 190 according to the present embodiment executes the activation processing of the camera application and also executes activation processing of the camera 230 provided in the information processing terminal 10. In addition, the display control unit 160 according to the present embodiment causes the part 210 of an object to be captured by the camera 230 to be displayed on the display 150. Here, the user U is executing an activation utterance SO1. Here, the activation utterance SO1 is an utterance for activating the camera application and the camera 230, and is an utterance of a predetermined word or phrase such as "activate", for example.

In the lower part of FIG. 15, in a case where the operation detection unit 140 detects a predetermined phrase from an utterance recognized by the input unit 130, the display control unit 160 according to the present embodiment causes the entire screen of the predetermined application to be displayed on the display 150. Here, the processing control unit 190 according to the present embodiment may execute the second processing.

In the example illustrated in the lower part of FIG. 15, the display control unit 160 according to the present embodiment causes the entire screen of the camera application to be displayed on the display 150 in response to the detection of the activation utterance SO1 by the user U by the operation detection unit 140.

As described above, with the display control unit 160 and the processing control unit 190 according to the present embodiment, it is possible to display the entire screen of the application on the basis of an utterance of a predetermined phrase by a user in response to application proposal to the user. With such a function, the information processing terminal 10 according to the present embodiment enables a user to perform an operation related to starting use of an application by an operation method corresponding to preference or a situation of each user.

<4. Control Flow>

Figure 16:
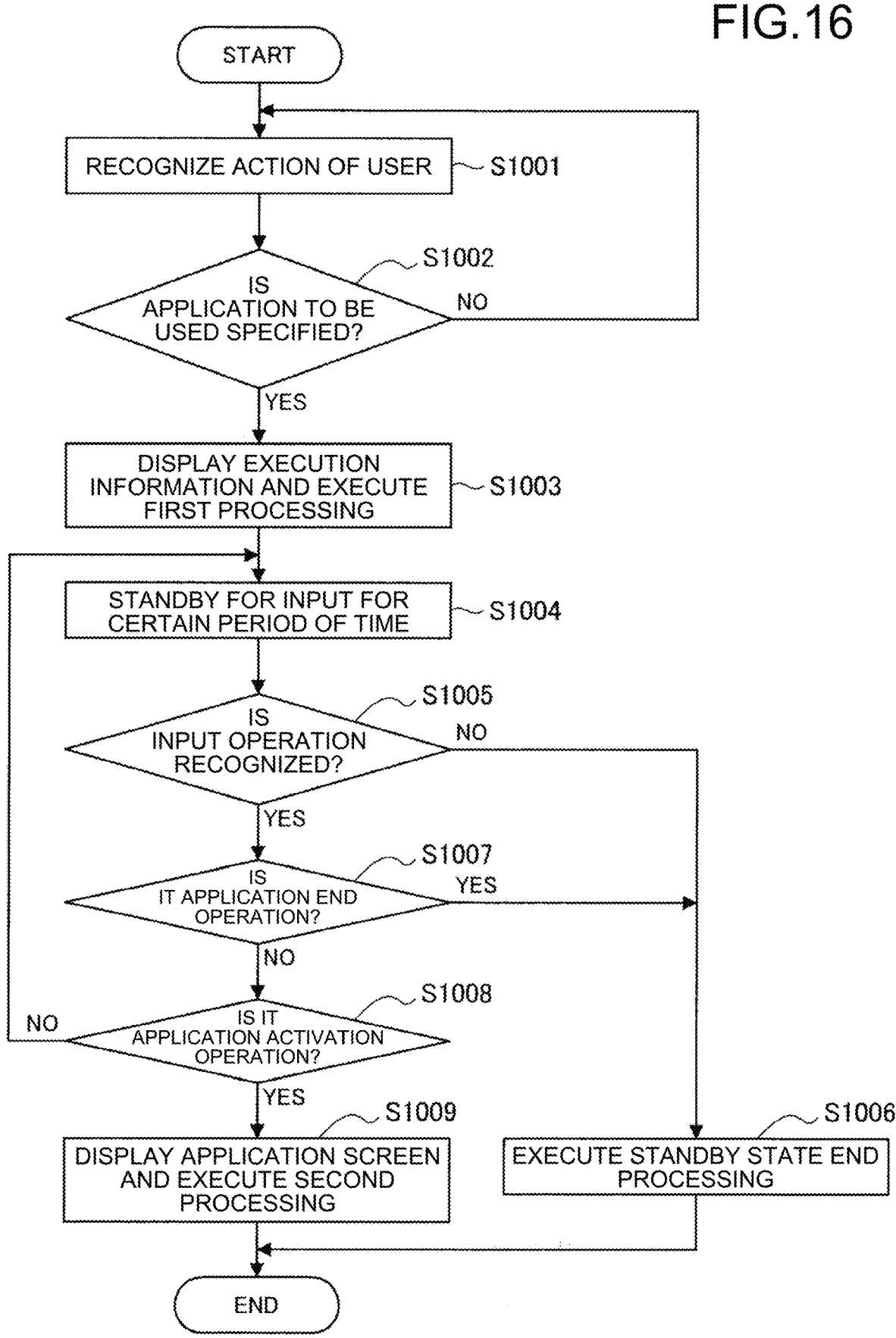
FIG. 16 is a flowchart illustrating an example of a flow of application proposal and activation processing according to the embodiment.

Next, a flow of operations related to application proposal and activation processing by the information processing terminal 10 according to the present embodiment will be described in detail. FIG. 16 is a flowchart illustrating an example of the flow of the application proposal and activation processing according to the present embodiment.

Referring to FIG. 16, first, the sensor unit 110 of the information processing terminal 10 outputs sensor information generated by an operation of a user or an action of the user recognized by the input unit 130 (S1001). Then, on the basis of the action of the user output in Step S1001, the specification unit 170 determines whether or not a predetermined application is specified (S1002). In a case where the predetermined application is not specified (S1002: NO), the processing returns to Step S1001. On the other hand, in a case where the predetermined application is specified (S1002: YES), the processing control unit 190 executes the first processing related to the application, and the display control unit 160 causes execution information related to execution of the application to be displayed on the display 150 (S1003).

Next, the operation detection unit 140 according to the present embodiment stands by for a certain period of time until a predetermined operation by the user on the information processing terminal 10 is detected (S1004). The operation detection unit 140 determines whether or not the operation by the user is detected within the certain period of time (S1005). In a case where the operation detection unit 140 does not detect the operation by the user on the information processing terminal 10 (S1005: NO), the processing control unit 190 executes end processing of the application on which the first processing has been executed, the display control unit 160 cancels the display of the execution information related to the execution of the application (S1006), and the operation ends. On the other hand, in a case where the operation by the user on the information processing terminal 10 is detected (S1005: YES), the operation detection unit 140 determines whether or not the detected operation is an application end operation (S1007). Here, the application end operation means an operation by the user for executing cancellation processing of activation of the application, for example, a touch operation on the operation end area 220.

In a case where the operation detected by the operation detection unit 140 is the application end operation (S1007: YES), the display of the execution information related to the execution of the application is canceled (S1006), and the operation ends. In a case where the operation detected by the operation detection unit 140 is not the application end operation (S1007: NO), the operation detection unit 140 determines whether or not the detected operation is an application activation operation (S1008). Here, the application activation operation means an operation by the user for activating the application, for example, a touch operation on a part 210 of a screen of the application. In a case where the operation detected by the operation detection unit 140 is not the application activation operation (S1008: NO), the processing returns to Step S1004. On the other hand, in a case where the operation detected by the operation detection unit 140 is the application activation operation (S1008: YES), the processing control unit 190 executes the second processing related to the application, the display control unit 160 causes the entire screen of the application to be displayed on the display 150 (S1009), and the operation ends.

<5. Example of Hardware Configuration>

Figure 17:
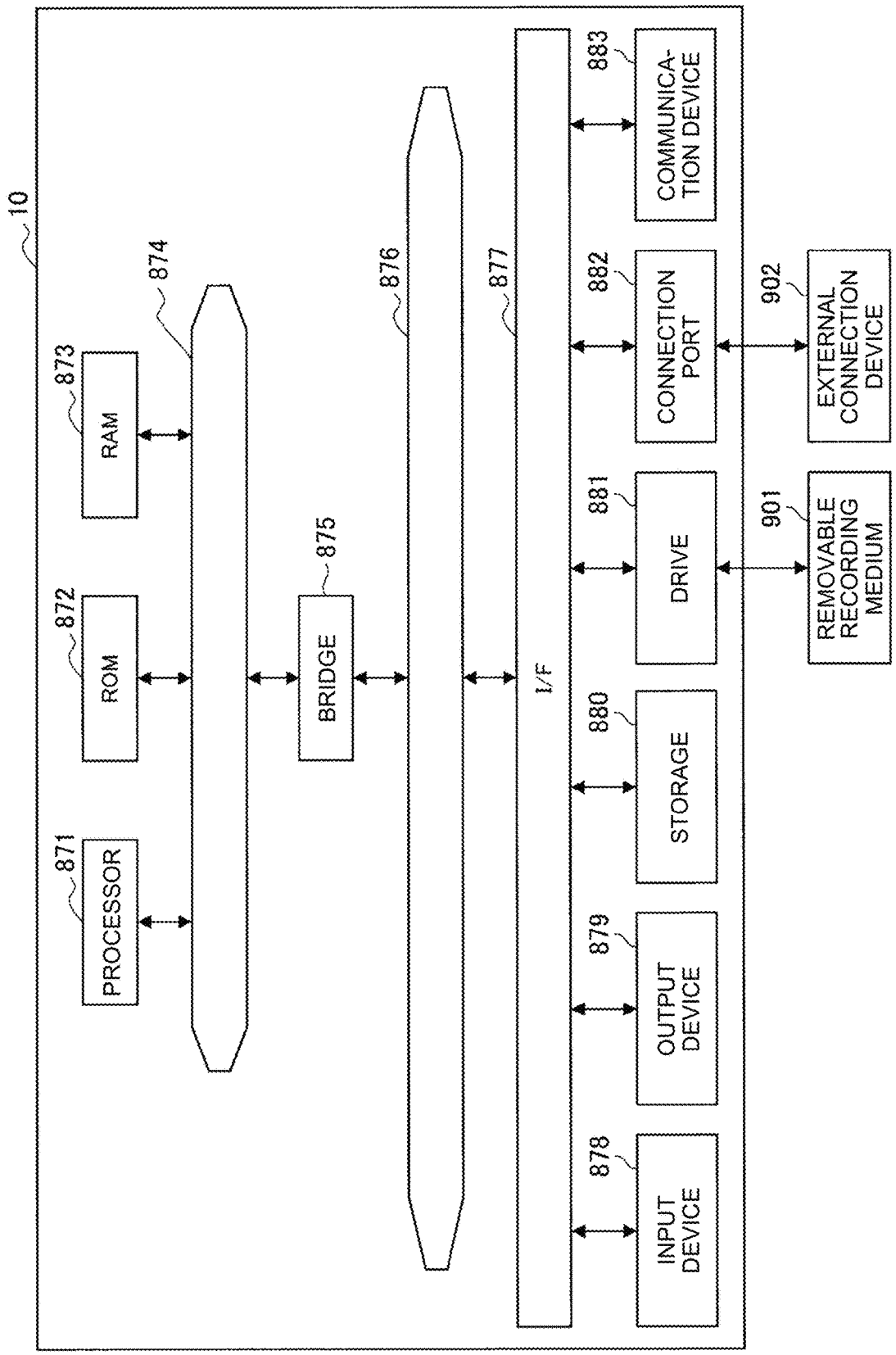
FIG. 17 is a block diagram illustrating an example of a hardware configuration of the information processing terminal 10 according to an embodiment of the present disclosure.

Next, an example of a hardware configuration of the information processing terminal 10 according to an embodiment of the present disclosure will be described. FIG. 17 is a block diagram illustrating the example of the hardware configuration of the information processing terminal 10 according to the embodiment of the present disclosure. Referring to FIG. 17, the information processing terminal 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated here may be further included.

(Processor 871)

The processor 871 functions as, for example, an arithmetic processing device or a control device, and controls the overall operation or a part of the operation of each component on the basis of various programs recorded in the ROM 872, the RAM 873, the storage 880, or a removable recording medium 901.

(ROM 872 and RAM 873)

The ROM 872 is means for storing a program read into the processor 871, data used for an arithmetic operation, and the like. The RAM 873 temporarily or permanently stores, for example, a program read into the processor 871 and various parameters that appropriately change when the program is executed.

(Host Bus 874, Bridge 875, External Bus 876, and Interface 877)

For example, the processor 871, the ROM 872, and the RAM 873 are connected to each other via the host bus 874 capable of high-speed data transmission. On the other hand, for example, the host bus 874 is connected to the external bus 876 having a relatively low data transmission speed via the bridge 875. In addition, the external bus 876 is connected to various components via the interface 877.

(Input Device 878)

As the input device 878, for example, a mouse, a keyboard, a touch panel, a button, a switch, or a lever is used. Furthermore, as the input device 878, a remote controller (hereinafter referred to as remote controller) capable of transmitting a control signal by using infrared rays or other radio waves may be used. In addition, the input device 878 includes an audio input device such as a microphone.

(Output Device 879)

The output device 879 is a device capable of visually or audibly notifying a user of acquired information, for example, a display device such as a cathode ray tube (CRT), an LCD, or an organic EL, an audio output device such as a speaker or a headphone, a printer, a mobile phone, or a facsimile. In addition, the output device 879 according to the present disclosure includes various vibration devices capable of outputting tactile stimuli.

(Storage 880)

The storage 880 is a device for storing various data. As the storage 880, for example, a magnetic storage device such as a hard disk drive (HDD), a semiconductor storage device, an optical storage device, or a magneto-optical storage device is used.

(Drive 881)

The drive 881 is, for example, a device for reading information recorded on the removable recording medium 901 such as a magnetic disk, an optical disk, a magneto-optical disk, or a semiconductor memory, or writing information on the removable recording medium 901.

(Removable Recording Medium 901)

The removable recording medium 901 is, for example, a DVD medium, a Blu-ray (registered trademark) medium, an HD DVD medium, or various semiconductor storage media. Needless to say, the removable recording medium 901 may be, for example, an IC card equipped with a non-contact type IC chip or an electronic device.

(Connection Port 882)

The connection port 882 is, for example, a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, or an IC recorder.

(Communication Device 883)

The communication device 883 is a communication device for connecting to a network, for example, a communication card for a wired or wireless LAN, Bluetooth (registered trademark), or a wireless USB (WUSB), a router for optical communication, a router for an asymmetric digital subscriber line (ADSL), or a modem for various types of communication.

<6. Conclusion>

As described above, with the functions related to the information processing terminal 10 according to an embodiment of the present disclosure, it is possible to propose an application corresponding to a situation of each user and to improve user convenience in starting use of the application.

The preferred embodiments of the present disclosure have been described above in detail with reference to the accompanying drawings, but the technical scope of the present disclosure is not limited to such examples. It is obvious that a person having ordinary knowledge in the technical field of the present disclosure can come up with various alterations or modifications within the scope of the technical idea described in the claims, and needless to say, it is understood that the alterations and the modifications also belong to the technical scope of the present disclosure.

In addition, the effects described in the present specification are merely illustrative or exemplary, and are not limitative. That is, the technique according to the present disclosure may exhibit other effects that are obvious to those skilled in the art from the description of the present specification, in addition to or in place of the effects described above.

In addition, each step related to the processing performed by the information processing terminal 10 in the present specification does not necessarily have to be processed in time series in the order described in the flowchart. For example, each step related to the processing performed by the information processing terminal 10 may be processed in an order different from the order described in the flowchart or may be processed in parallel.

Note that the following configurations also belong to the technical scope of the present disclosure.

(1) An information processing apparatus comprising:
a display control unit configured to display, on a display screen, execution information related to execution of at least one application specified on the basis of a predetermined determination result; and
a processing control unit configured to
execute first processing in a case where the at least one application is specified, and
execute second processing on the basis of a response of a user to the displayed execution information.

(2) The information processing apparatus according to (1), wherein
the first processing is an activation preparation processing related to the application, and
the second processing is an activation processing related to the application.

(3) The information processing apparatus according to (1), wherein
the first processing is to bring the application into a background state, and
the second processing is to bring the application into a foreground state.

(4) The information processing apparatus according to (1) or (3), wherein
the execution information is a part of a screen of the application,
the display control unit displays an entire screen of the application on the basis of the response of the user to the displayed part of the screen of the application, and
the processing control unit executes the second processing on the basis of the response of the user to the displayed part of the screen of the application.

(5) The information processing apparatus according to (4), wherein
the displayed part of the screen of the application includes the screen of the application and an image belonging to a layer higher than the screen of the application.

(6) The information processing apparatus according to any one of (1) to (3), wherein
the execution information includes an icon related to the application, and
the processing control unit executes the second processing on the basis of the response of the user to the displayed icon.

(7) The information processing apparatus according to any one of (1) to (6), wherein
the response of the user is a touch operation by the user on the display screen, and the processing control unit executes the second processing corresponding to a position on the display screen, the touch operation being performed on the position.
(8) The information processing apparatus according to any one of (1) to (6), wherein
the response of the user is execution of a predetermined utterance by the user, and
the processing control unit executes the second processing on the basis of a phrase of the predetermined utterance.
(9) The information processing apparatus according to any one of (1) to (8), wherein
the display control unit cancels the display of the execution information in a case where the response of the user is not recognized within a predetermined time after the first processing is executed, and
the processing control unit executes cancellation processing related to the first processing in the case where the response of the user is not recognized within the predetermined time after the first processing is executed.
(10) The information processing apparatus according to any one of (1) to (9), wherein
the at least one application is a camera application, and
the predetermined determination result includes operation information related to the user.
(11) The information processing apparatus according to (10), wherein
the processing control unit further executes activation processing of a camera in a case where the camera application is specified.
(12) The information processing apparatus according to any one of (1) to (9), wherein
the at least one application is a map application, and
the predetermined determination result includes determination that the user is in a predetermined position.
(13) The information processing apparatus according to any one of (1) to (9), wherein
the at least one application is a music reproduction application.
(14) The information processing apparatus according to any one of (1) to (13), wherein
the predetermined determination result includes a determination result based on an action of the user, and
the processing control unit executes the first processing on the basis of the predetermined determination result.
(15) The information processing apparatus according to any one of (1) to (14), wherein
the predetermined determination result includes a determination result based on setting information related to the application, and
the processing control unit executes the first processing on the basis of the predetermined determination result.
(16) The information processing apparatus according to any one of (1) to (15), wherein
the predetermined determination result includes a determination result based on operation information related to the user, and
the processing control unit executes the first processing on the basis of the predetermined determination result.
(17) A method comprising, by using a processor:
displaying, on a display screen, execution information related to execution of at least one application specified on the basis of a predetermined determination result; and
executing first processing in a case where the at least one application is specified, and
executing second processing on the basis of a response of a user to the displayed execution information.
(18) A program for causing a computer to function as
an information processing apparatus comprising:
a display control unit configured to display, on a display screen, execution information related to execution of at least one application specified on the basis of a predetermined determination result; and
a processing control unit configured to
execute first processing in a case where the at least one application is specified, and
execute second processing on the basis of a response of a user to the displayed execution information.

REFERENCE SIGNS LIST

10 INFORMATION PROCESSING TERMINAL
110 SENSOR UNIT
120 STORAGE UNIT
130 INPUT UNIT
140 OPERATION DETECTION UNIT
150 DISPLAY
160 DISPLAY CONTROL UNIT
170 SPECIFICATION UNIT
180 COMMUNICATION UNIT
190 PROCESSING CONTROL UNIT
20 NETWORK

The invention claimed is:
1. An information processing apparatus comprising:
processing circuitry configured to
display, on a display screen, execution information related to execution of at least one application specified based on a predetermined determination result, wherein the execution information is a discrete portion of an entire screen of an application of the at least one application;
execute first processing in a case where the at least one application is specified, and
execute second processing based on a response of a user to the displayed execution information.
2. The information processing apparatus according to claim 1, wherein
the first processing is an activation preparation processing related to the application, and
the second processing is an activation processing related to the application.
3. The information processing apparatus according to claim 1, wherein
the first processing is to bring the application into a background state, and
the second processing is to bring the application into a foreground state.
4. The information processing apparatus according to claim 1, wherein the processing circuitry is further configured to
display an entire screen of the application based on the response of the user to the displayed discrete portion of the entire screen of the application, and
execute the second processing based on the response of the user to the displayed discrete portion of the entire screen of the application.
5. The information processing apparatus according to claim 4, wherein
the displayed discrete portion of the entire screen of the application includes the screen of the application and an image belonging to a layer higher than the screen of the application.

6. The information processing apparatus according to a claim 1, wherein
the execution information includes an icon related to the application, and
the processing circuitry is further configured to execute the second processing based on the response of the user to the displayed icon.

7. The information processing apparatus according to claim 1, wherein
the response of the user is a touch operation by the user on the display screen, and
the processing circuitry is further configured to execute the second processing corresponding to a position on the display screen, the touch operation being performed on the position.

8. The information processing apparatus according to claim 1, wherein
the response of the user is execution of a predetermined utterance by the user, and
the processing circuitry is further configured to execute the second processing based on a phrase of the predetermined utterance.

9. The information processing apparatus according to claim 1, wherein the processing circuitry is further configured to
cancel the display of the execution information in a case where the response of the user is not recognized within a predetermined time after the first processing is executed, and
execute cancellation processing related to the first processing in the case where the response of the user is not recognized within the predetermined time after the first processing is executed.

10. The information processing apparatus according to claim 1, wherein
the at least one application is a camera application, and
the predetermined determination result includes operation information related to the user.

11. The information processing apparatus according to claim 10, wherein
the processing circuitry is further configured to execute activation processing of a camera in a case where the camera application is specified.

12. The information processing apparatus according to claim 1, wherein
the at least one application is a map application, and
the predetermined determination result includes determination that the user is in a predetermined position.

13. The information processing apparatus according to claim 1, wherein
the at least one application is a music reproduction application.

14. The information processing apparatus according to claim 1, wherein
the predetermined determination result includes a determination result based on an action of the user, and
the processing circuitry is further configured to execute the first processing based on the predetermined determination result.

15. The information processing apparatus according to claim 1, wherein
the predetermined determination result includes a determination result based on setting information related to the application, and
the processing circuitry is further configured to execute the first processing based on the predetermined determination result.

16. The information processing apparatus according to claim 1, wherein
the predetermined determination result includes a determination result based on operation information related to the user, and
the processing circuitry is further configured to execute the first processing based on the predetermined determination result.

17. A method comprising, by using a processor:
displaying, on a display screen, execution information related to execution of at least one application specified based on a predetermined determination result, wherein the execution information is a discrete portion of an entire screen of an application of the at least one application; and
executing first processing in a case where the at least one application is specified, and
executing second processing based on a response of a user to the displayed execution information.

18. A non-transitory computer-readable program for causing a computer to function as an information processing apparatus so that the computer is configured to:
display, on a display screen, execution information related to execution of at least one application specified based on a predetermined determination result, wherein the execution information is a discrete portion of an entire screen of an application of the at least one application;
execute first processing in a case where the at least one application is specified, and
execute second processing based on a response of a user to the displayed execution information.

* * * * *